US011072535B2

(12) United States Patent
Feyen et al.

(10) Patent No.: US 11,072,535 B2
(45) Date of Patent: Jul. 27, 2021

(54) ZEOLITIC MATERIAL HAVING FRAMEWORK TYPE CHA AND COMPRISING A TRANSITION METAL AND ONE OR MORE OF POTASSIUM AND CESIUM

(71) Applicant: BASF SE, Ludwigshafen am Rhein (DE)

(72) Inventors: Mathias Feyen, Ludwigshafen (DE); Ulrich Mueller, Ludwigshafen (DE); Xinhe Bao, Dalian (CN); Weiping Zhang, Dalian (CN); Dirk De Vos, Leuven (BE); Hermann Gies, Bochum (DE); Feng-Shou Xiao, Hangzhou (CN); Toshiyuki Yokoi, Meguro-ku (JP); Ute Kolb, Mainz (DE); Bernd Marler, Bochum (DE); Yong Wang, Meguro-ku (JP); Trees De Baerdemaeker, Leuven (BE); Chuan Shi, Dalian (CN); Xiulian Pan, Dalian (CN); Xiangju Meng, Hangzhou (CN)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/631,911

(22) PCT Filed: Aug. 3, 2018

(86) PCT No.: PCT/CN2018/098471
§ 371 (c)(1),
(2) Date: Jan. 17, 2020

(87) PCT Pub. No.: WO2019/024909
PCT Pub. Date: Feb. 7, 2019

(65) Prior Publication Data
US 2020/0223705 A1  Jul. 16, 2020

(30) Foreign Application Priority Data

Aug. 4, 2017 (WO) ............... PCT/CN2017/095981

(51) Int. Cl.
*C01B 39/46* (2006.01)
*B01J 29/76* (2006.01)
*C01B 39/02* (2006.01)

(52) U.S. Cl.
CPC ............ *C01B 39/46* (2013.01); *B01J 29/763* (2013.01); *C01B 39/026* (2013.01); *B01J 2229/186* (2013.01); *B01J 2229/34* (2013.01)

(58) Field of Classification Search
CPC ....... C01B 39/026; C01B 39/46; C01B 39/48; B01J 29/763; B01J 2229/34; B01J 2229/186
See application file for complete search history.

(56) References Cited

U.S. PATENT DOCUMENTS 8,715,618 B2   5/2014 Trukhan et al.
9,028,795 B2   5/2015 Yilmaz et al.
(Continued)

FOREIGN PATENT DOCUMENTS

CN   102099293 A   6/2011
CN   103917492 A   7/2014
CN   103930370 A   7/2014

OTHER PUBLICATIONS

U.S. Appl. No. 15/779,218, filed May 25, 2018, US 2018-0345245 A1, Stefan Maurer, et al.
(Continued)

*Primary Examiner* — David M Brunsman
(74) *Attorney, Agent, or Firm* — Lowenstein Sandler LLP

(57) ABSTRACT

A zeolitic material having framework type CHA, comprising a transition metal M and an alkali metal A, and having a framework structure comprising a tetravalent element Y, a
(Continued)

trivalent element X and O, wherein the transition metal M is a transition I metal of groups 7 to 12 of the periodic table, A is one or more of K and Cs, Y is one or more of Si, Ge, Ti, Sn and Zr, and X is one or more of Al, B, Ga and In. A process for preparing such a zeolitic material. Use of such a zeolitic material.

15 Claims, 12 Drawing Sheets

(56) References Cited

U.S. PATENT DOCUMENTS

| | | | |
|---|---|---|---|
| 9,272,272 B2* | 3/2016 | Trukhan | B01D 53/9418 |
| 9,334,170 B2 | 5/2016 | Yilmaz et al. | |
| 9,670,415 B2* | 6/2017 | Yilmaz | C07C 1/20 |
| 10,435,381 B2 | 10/2019 | Teles et al. | |
| 10,544,115 B2 | 1/2020 | Riedel et al. | |
| 10,544,116 B2 | 1/2020 | Teles et al. | |
| 2011/0076229 A1 | 3/2011 | Trukhan et al. | |
| 2013/0059723 A1 | 3/2013 | Yilmaz et al. | |
| 2013/0064758 A1 | 3/2013 | Yilmaz et al. | |
| 2013/0101503 A1 | 4/2013 | Yilmaz et al. | |
| 2014/0234206 A1 | 8/2014 | Trukhan et al. | |
| 2015/0367337 A1* | 12/2015 | Yang | B01J 37/0246 423/239.2 |

OTHER PUBLICATIONS

U.S. Appl. No. 16/086,251, filed Sep. 18, 2018, Kalo Benedikt, et al.
U.S. Appl. No. 15/779,314, filed May 25, 2018, US 2018-0333696 A1, Julia Burckhart, et al.
U.S. Appl. No. 16/060,260, filed Jun. 7, 2018, US 2018-0362353 A1, NIcolas Vautravers, et al.
U.S. Appl. No. 16/321,252, filed Jan. 28, 2019, US 2019-0169037 A1, Natalia Trukhan, et al.
U.S. Appl. No. 16/349,364, filed May 13, 2019, US 2019-0367377 A1, Andrei-Nicolae Parvulescu, et al.
U.S. Appl. No. 16/461,134, filed May 15, 2019, US 2020-0070134 A1, Andrei-Nicolae Parvulescu, et al.
U.S. Appl. No. 16/470,834, filed Jun. 18, 2019, US 2020-0086306 A1, Andrei-Nicolae Parvulescu, et al.
U.S. Appl. No. 16/462,430, filed May 20, 2019, US 2019-0321811 A1, Andrei-Nicolae Parvulescu, et al.
U.S. Appl. No. 16/308,730, filed Dec. 10, 2018, US 2019-0143272 A1, Natalia Trukhan, et al.
U.S. Appl. No. 15/775,657, filed May 11, 2018, US 2018-0328601 A1, Matthias Weickert, et al.
U.S. Appl. No. 16/060,739, filed Jun. 8, 2018, US 2018-0362357 A1, Mathias Feyen, et al.
U.S. Appl. No. 16/462,408, filed May 20, 2019, US 2019-0366313 A1, Robert McGuire, et al.
U.S. Appl. No. 16/060,229, filed Jun. 7, 2018, US 2018-0362351 A1, Andrei-Nicolae Parvulescu, et al.
U.S. Appl. No. 16/315,345, filed Jan. 4, 2019, US 2019-0322634 A1, Joaquim Henrique Teles, et al.
U.S. Appl. No. 16/310,645, filed Dec. 17, 2018, US 2019-0330171 A1, Andrei-Nicolae Parvulescu, et al.
U.S. Appl. No. 16/304,511, filed Nov. 26, 2018, US 2019-0134564 A1, Mathias Feyen, et al.
U.S. Appl. No. 16/463,263, filed May 22, 2019, US 2019-0300375 A1, Robert McGuire, et al.
U.S. Appl. No. 16/631,911, filed Jan. 17, 2020, Mathias Feyen, et al.
U.S. Appl. No. 16/607,551, filed Oct. 23, 2019, US 2020-0114340 A1, Mathias Feyen, et al.
U.S. Appl. No. 16/469,782, filed Jun. 14, 2019, US 2020-0079725 A1, Marie Katrin Schroeter, et al.
U.S. Appl. No. 16/308,928, filed Dec. 11, 2018, US 2019-0144290 A1, Stefan Marx, et al.
U.S. Appl. No. 16/464,894, filed May 29, 2019, US 2019-0389794 A1, Andrei-Nicolae Parvulescu, et al.
U.S. Appl. No. 16/464,943, filed May 29, 2019, US 2019-0308928 A1, Andrei-Nicolae Parvulescu, et al.
U.S. Appl. No. 16/464,966, filed May 29, 2019, US 2019-0308929 A1, Andrei-Nicolae Parvulescu, et al.
U.S. Appl. No. 16/330,592, filed Mar. 5, 2019, Andrei-Nicolae Parvulescu, et al.
U.S. Appl. No. 16/607,514, filed Oct. 23, 2019, US 2020-0139357 A1, Robert McGuire, et al.
U.S. Appl. No. 16/607,532, filed Oct. 23, 2019, US 2020-0140354 A1, Robert McGuire.
U.S. Appl. No. 16/336,661, filed Mar. 26, 2019, Andrei-Nicolae Parvulescu, et al.
U.S. Appl. No. 16/488,962, filed Aug. 27, 2019, US 2020-0002255 A1, Andrei-Nicolae Parvulescu, et al.
U.S. Appl. No. 16/605,133, filed Oct. 14, 2019, Robert McGuire, et al.
U.S. Appl. No. 16/605,069, filed Oct. 14, 2019, Moini Ahmad, et al.
U.S. Appl. No. 16/485,291, filed Aug. 12, 2019, US 2019-0375724 A1, Alvaro Gordillo, et al.
U.S. Appl. No. 16/500,313, filed Oct. 2, 2019, Woerz Nicolai Tonio, et al.
U.S. Appl. No. 16/610,131, filed Nov. 1, 2019, US 2020-0087246 A1, Alvaro Gordillo, et al.
U.S. Appl. No. 16/485,077, filed Aug. 9, 2019, US 2019-0358613 A1, Stefan Ernst, et al.
International Search Report and Written Opinion dated Nov. 2, 2018, in PCT/CN2018/098471, citing documents AA-AK and AO-AQ therein, 9 pages.

* cited by examiner

ZEOLITIC MATERIAL HAVING FRAMEWORK TYPE CHA AND COMPRISING A TRANSITION METAL AND ONE OR MORE OF POTASSIUM AND CESIUM

This application is a 371 filing of PCT/CN2018/098471, filed Aug. 3, 2018.

The present invention relates to a zeolitic material having framework type CHA, comprising a transition metal M and an alkali metal A, and having a framework structure comprising a tetravalent element Y, a trivalent element X and O, wherein the transition metal M is a transition metal of groups 7 to 12 of the periodic table, A is one or more of K and Cs, Y is one or more of Si, Ge, Ti, Sn and Zr, and X is one or more of Al, B, Ga and In. Further, the present invention relates to a process for preparing a zeolitic material, preferable the aforesaid zeolitic material. The present invention also relates to a zeolitic material which is obtainable or obtained by said process, and further relates to the use of said zeolitic material as a catalytically active material, as a catalyst, or as a catalyst component.

Zeolitic materials having framework type CHA containing a transition metal such as copper or iron are known to be potentially effective as catalysts or catalyst components for treating combustion exhaust gas in industrial applications, for example for converting nitrogen oxides ($NO_x$) in an exhaust gas stream.

It was an object of the present invention to provide a novel zeolitic material having framework type CHA comprising a transition metal which, in particular, exhibits advantageous characteristics when used as a catalyst or a catalyst component for treating combustion exhaust gas in industrial applications.

Surprisingly, it was found that this object is solved by a zeolitic material having framework type CHA which comprises a transition metal M and further comprises one of more alkali metals which are one of more of potassium and cesium. In particular, it was found that this zeolitic material used as catalyst or catalyst component allows for a very good conversion of nitrogen oxides wherein a high activity over a broad temperature range was also observed.

Therefore, the present invention relates to a zeolitic material having framework type CHA, comprising a transition metal M and an alkali metal A, and having a framework structure comprising a tetravalent element Y, a trivalent element X and O, wherein the transition metal M is a transition metal of groups 7 to 12 of the periodic table, A is one or more of K and Cs, Y is one or more of Si, Ge, Ti, Sn and Zr, and X is one or more of Al, B, Ga and In.

Preferably, the zeolitic material comprises the transition metal M in an amount in the range of from 0.5 to 7.5 weight-%, more preferably in the range of from 1 to 6 weight-%, more preferably in the range of from 2 to 5 weight-%, calculated as elemental M and based on the total weight of the zeolitic material. Preferably, M comprises one or more of Cu and Fe, preferably Cu, wherein more preferably, M is Cu.

Preferably, the zeolitic material comprises the alkali metal A in an amount in the range of from 0.05 to 5 weight-%, more preferably in the range of from 0.1 to 3.5 weight-%, more preferably in the range of from 0.2 to 3 weight-%, more preferably in the range of from 0.25 to 2.5 weight-%, more preferably in the range of from 0.2 to 1 weight-%, calculated as elemental A and based on the total weight of the zeolitic material.

According to an embodiment of the present invention, A preferably comprises, more preferably is K. According to this embodiment, it is preferred that the zeolitic material comprises A in an amount in the range of from 0.05 to 1.5 weight-%, more preferably in the range of from 0.1 to 1 weight-%, more preferably in the range of from 0.25 to 0.75 weight-%, calculated as elemental A and based on the total weight of the zeolitic material.

According to a further embodiment of the present invention, A preferably comprises, more preferably is Cs. According to this embodiment, it is preferred that the zeolitic material comprises A in an amount in the range of from 0.35 to 2 weight-%, more preferably in the range of from 0.45 to 1.25 weight-%, calculated as elemental A and based on the total weight of the zeolitic material, or comprising A in an amount in the range of from 0.5 to 3.5 weight-%, more preferably in the range of from 1 to 3 weight-%, more preferably in the range of from 1.5 to 2.5 weight-%, calculated as elemental A and based on the total weight of the zeolitic material.

The zeolitic material comprises an alkali metal A which is one or more of K and Cs. Other alkali metals may further be comprised in the zeolitic material of the present invention, such as Na, Li and K. Preferably, the zeolitic material further comprises Na, preferably in an amount in the range of from 0.05 to 1 weight-%, more preferably in the range of from 0.1 to 0.75 weight-%, more preferably in the range of from 0.15 to 0.5 weight-%, more preferably in the range of from 0.15 to 0.4 weight-%, calculated as elemental Na and based on the total weight of the zeolitic material.

In the zeolitic material having framework type CHA, the molar ratio of Y relative to X, calculated as $YO_2:X_2O_3$, is not subject to any specific restrictions. Preferably, the zeolitic material has a framework structure wherein the molar ratio of Y relative to X, calculated as $YO_2:X_2O_3$, is in the range of from 3:1 to 20:1, more preferably in the range of from 4:1 to 15:1. More preferably, the zeolitic material has a framework structure wherein the molar ratio of Y relative to X, calculated as $YO_2:X_2O_3$, in the range of from 5:1 to 10:1.

Preferably, the zeolitic material comprises Y which comprises, preferably is Si. Preferably, the zeolitic material comprises X which comprises, preferably is Al. Preferably, the zeolitic material comprises Y which comprises, preferably is Si and X which comprises, preferably is Al. More preferably, Y is Si and X is Al.

In addition to the transition metal M, the alkali metal A, the tetravalent element Y, the trivalent element X, and O, and preferably H, the zeolitic material may comprise one or more further additional components. Preferably at least 98 weight-%, more preferably at least 99 weight-%, more preferably at least 99.5 weight-% of the zeolitic material consist of M, A, Y, X, O, H, and optionally Na.

In addition to the tetravalent element Y, the trivalent element X, and O, and preferably H, the framework structure of the zeolitic material may comprise one or more further additional components. Preferably at least 98 weight-%, more preferably at least 99 weight-%, more preferably at least 99.5 weight-% of the framework structure consist of Y, X, O, and H.

Preferably, the zeolitic material of the present invention has a total amount of acid sites in the range of from 2.0 to 3.2 mmol/g, wherein the total amount of acid sites is defined as the total molar amount of desorbed ammonia per mass of the zeolitic material determined according to the temperature programmed desorption of ammonia (NH3-TPD) as described in Reference Example 1.1 herein; wherein the zeolitic material has an amount of medium acid sites in the range of from 1.0 to 1.7 mmol/g, wherein the amount of medium acid sites is defined as the amount of desorbed ammonia per mass of the zeolitic material determined according to the temperature programmed desorption of ammonia (NH3-TPD) as described in Reference Example 1.1 herein in the temperature range of from 250 to 450° C. More preferably, the zeolitic material of the present invention has a total amount of acid sites in the range of from 2.1 to 3.1 mmol/g, more preferably in the range of from 2.2 to 3.0 mml/g. More preferably, the amount of medium acid sites is in the range of from 1.1 to 1.6 mmol/g, more preferably in the range of from 1.2 to 1.5 mmol/g.

Preferably, the zeolitic material exhibits a peak having a maximum in the range of from 207 to 202 nm, determined according to UV-Vis spectroscopy as described in Reference Example 1.2 herein.

Preferably, the zeolitic material exhibits a peak having a maximum in the range of from 1,945 to 1,950 $cm^{-1}$, a peak having a maximum in the range of from 2,245 to 2,250 $cm^{-1}$, a peak having a maximum in the range of from 1,925 to 1,930 $cm^{-1}$, a peak having a maximum in the range of from 1,870 to 1,880 $cm^{-1}$, and a peak having a maximum in the range of from 1,805 to 1,810 $cm^{-1}$, determined according to NO adsorption via FT-IR as described in Reference Example 1.3 herein at a pressure of 1,000 Pa.

Preferably, the zeolitic material is a calcined zeolitic material, preferably having been calcined in a gas stream comprising oxygen, preferably one or more of oxygen, air and lean air, said gas stream having a temperature in the range of from 450 to 550° C., preferably for a period in the range of 4 to 6 h.

The zeolitic material of the present invention having framework type CHA can be used for any conceivable purpose, including, but not limited to, an absorbent, an adsorbent, a molecular sieve, a catalyst, a catalyst carrier or an intermediate for preparing one or more thereof. Preferably, the zeolitic material of the present invention is used as a catalytically active material, as a catalyst, or as a catalyst component, more preferably for the selective catalytic reduction of nitrogen oxides in an exhaust gas stream, preferably an exhaust gas stream from a diesel engine. Further preferably, the zeolitic material of the present invention is used as a catalytically active material, as a catalyst, or as a catalyst component for the conversion of a C1 compound to one or more olefins, more preferably for the conversion of methanol to one or more olefins or the conversion of a synthetic gas comprising carbon monoxide and hydrogen to one or more olefins.

Further, the present invention relates to a process for preparing a zeolitic material, preferably the zeolitic material as described herein above, comprising
(i) providing a zeolitic material having framework type CHA in its ammonium form, the zeolitic material comprising an alkali metal A, and having a framework structure comprising a tetravalent element Y, a trivalent element X and O, wherein A is one or more of K and Cs, Y is one or more of Si, Ge, Ti, Sn and Zr, and X is one or more of Al, B, Ga and In;
(ii) subjecting the zeolitic material having framework type CHA in its ammonium form obtained from (i) to ion exchange conditions, comprising bringing the zeolitic material having framework type CHA in its ammonium form in contact with a solution comprising ions of a transition metal M of groups 7 to 12 of the periodic table, obtaining a mixture comprising a zeolitic material having framework type CHA, comprising a transition metal M and an alkali metal A, and having a framework structure comprising a tetravalent element Y, a trivalent element X and O;
(iii) separating the zeolitic material from the mixture obtained in (ii).

Generally, no specific restrictions exist how the zeolitic material having framework type CHA in its ammonium form is provided according to (i). Preferably, providing a zeolitic material having framework type CHA in its ammonium form according to (i) comprises
(i.1) preparing a synthesis mixture comprising water, a source of Y, a source of X, a source of A, and preferably a source of Na;
(i.2) subjecting the synthesis mixture prepared according to (i.1) to hydrothermal crystallization conditions comprising heating the synthesis mixture to a temperature in the range of from 150 to 200° C. and keeping the synthesis mixture at a temperature in this range under autogenous pressure, obtaining a mother liquor comprising a zeolitic material having framework type CHA which comprises A and preferably Na;
(i.3) separating the zeolitic material obtained from (i.2) from the mother liquor;
(i.4) subjecting the zeolitic material obtained from (i.3) to ion exchange conditions, comprising bringing a solution comprising ammonium ions in contact with the zeolitic material obtained from (i.3), obtaining a zeolitic material having framework type CHA in its ammonium form.

Generally, according to (Li) any suitable source of the tetravalent element Y can be used. In particular if Y is Si, the source of Y comprises, more preferably is, one or more of any type of silicas and/or silicates and/or silica derivatives, wherein the source of Y compreferably comprises one or more of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, and mixtures of any two or more of the afore-mentioned compounds. More preferably, the source of Y used in step (i.1) of the inventive process are selected from the group consisting of fumed silica, silica hydrosols, reactive amorphous solid silicas, silica gel, silicic acid, colloidal silica, silicic acid esters, and mixtures of two or more thereof. According to said particularly preferred embodiments, it is further preferred that the source of Y is one or more of fumed silica, silica hydrosols, reactive amorphous solid silicas, silica gel, colloidal silica, and mixtures of two or more thereof. More preferably, if the source of the tetravalent element Y is Si, the source of Y according to (i.1) comprises one or more of a silica and a silicate, preferably one or more of a colloidal silica and a fumed silica, more preferably a fumed silica.

Generally, according to (i.1) any suitable source of the trivalent element X can be used. In particular if X is Al, the source of X comprises, more preferably is one or more of alumina, aluminum salts, and mixtures of two or more thereof, wherein more preferably the source of X are is one or more of alumina, aluminum tri($C_1$-$C_5$)alkoxide, AlO(OH), Al(OH)$_3$, aluminum halides, and mixtures of two or more thereof, wherein the aluminum halides are preferably aluminum chloride and/or chloride and/or bromide, more preferably aluminum fluoride and/or chloride, and even more preferably aluminum chloride. It is more preferred that the one or more sources of X comprise one or more compounds selected from the group consisting of aluminum chloride, aluminum sulfate, aluminum phosphate, aluminum fluorosilicate, and mixtures of two or more thereof, wherein more preferably the source of X comprise one or more of aluminum tri($C_2$-$C_4$)alkoxide, AlO(OH), Al(OH)$_3$, aluminum chloride, aluminum sulfate, aluminum phosphate, and mixtures of two or more thereof. It is more preferred that the source of X comprises one or more of aluminum tri($C_2$-$C_3$) alkoxide, AlO(OH), Al(OH)$_3$, aluminum chloride, aluminum sulfate, and mixtures of two or more thereof, more preferably one or more of aluminum tripropoxides, AlO(OH), aluminum sulfate, and mixtures of two or more thereof, wherein more preferably the source of X comprises aluminum triisopropoxide, and wherein more preferably the one or more sources of X consists of aluminum triisopropoxide. Therefore, if X is Al, the source of X according to (i.1) comprises one or more of alumina and an aluminum salt, preferably an aluminum salt, more preferably an aluminum trialkoxide. More preferably X is Al and the source of X according to (i.1) comprises or is aluminum triisopropylate.

More preferably, Y is Si and X is Al, and the source of Y according to (i.1) comprises one or more of silica and a silicate, preferably one or more of a colloidal silica, a fumed silica and a colloidal silica, more preferably a fumed silica, and the source of X according to (i.1) comprises one or more of alumina and an aluminum salt, preferably an aluminum salt, more preferably an aluminum trialkoxide, more preferably comprises or is aluminum triisopropylate.

Preferably, the source of the alkali metal A according to (i.1) comprises one or more of a halide of A, a nitrate of A, and a hydroxide of A, preferably a hydroxide of A. More preferably the source of the alkali metal A according to (i.1) comprises or is KOH. More preferably the source of the alkali metal A according to (i.1) comprises or is CsOH.

If a source of Na is used in (i.1), the source of the Na according to (i.1) preferably comprises one or more of a sodium silicate, preferably $Na_2SiO_3$, a sodium aluminate, preferably $NaAlO_2$, a sodium halide and sodium hydroxide, preferably sodium hydroxide. If a source of Na is used in (i.1), the source of the Na according to (i.1) preferably comprises or is NaOH.

The synthesis mixture prepared in (i.1) which is subjected to (i.2) is not restricted to any particular molar ratio of the components comprised in the mixtures.

Preferably, in the synthesis mixture prepared according to (L1), the molar ratio of the source of Y relative to the source of X, calculated as $YO_2:X_2O_3$, is in the range of from 1:0.02 to 1:0.15, preferably in the range of from 1:0.03 to 1:0.1, more preferably in the range of from 1:0.04 to 1:0.08;

the molar ratio of the source of Y relative to the source of A, calculated as $O_2:A_2O$, is in the range of from 1:0.002 to 1:0.2, preferably in the range of from 1:0.005 to 1:0.15, more preferably in the range of from 1:01 to 1:0.1;

the molar ratio of the source of Y relative to the water, calculated as $YO_2:H_2O$, is in the range of from 1:75 to 1:125, preferably in the range of from 1:85 to 1:115, more preferably in the range of from 1:95 to 1:105;

the molar ratio of the source of Y relative to the source of Na, calculated as $YO_2:Na_2O$, is in the range of from 1:0.05 to 1:0.75, preferably in the range of from 1:0.1 to 1:0.5, more preferably in the range of from 1:0.15 to 1:0.4.

The synthesis mixture prepared according to (i1) preferably further comprises a seed crystal material comprising a zeolitic material preferably having framework type CHA, more preferably a zeolitic material having framework type CHA and having a framework structure comprising the tetravalent element Y, the trivalent element X and O, more preferably a zeolitic material having framework type CHA, comprising sodium and having a framework structure comprising the tetravalent element Y, the trivalent element X and O.

Preferably, the synthesis mixture prepared according to (i.1) comprises the seed crystal material in an amount in the range of from 10 to 30 weight-%, more preferably in the range of from 15 to 25 weight-%, more preferably in the range of from 17.5 to 22.5 weight-%, based on the total weight of Si, calculated as $SiO_2$, comprised in the synthesis mixture.

Although it is generally conceivable, it is preferred that the synthesis mixture prepared according to (i.1) contains no framework type CHA directing organotemplate compound, more preferably no framework type CHA directing compound (structure directing agent, SDA).

Step (i.2) of the inventive process comprises subjecting the synthesis mixture prepared according to (i.1) to hydrothermal crystallization conditions, preferably by heating the synthesis mixture to a temperature in the range of from 155 to 190° C., more preferably in the range of from 160 to 180° C., more preferably in the range of from 165 to 175° C. Preferably, subjecting the synthesis mixture prepared according to (i.1) to hydrothermal crystallization conditions according to (i.2) comprises keeping the synthesis mixture at the temperature in this range under autogenous pressure for a period of time in the range of from 6 h to 5 d, preferably in the range of from 12 h to 4 d, more preferably in the range of from 1 d to 3 d. Preferably, subjecting the synthesis mixture prepared according to (i.1) to hydrothermal crystallization conditions according to (i.2) is carried out in an autoclave.

Since the hydrothermal crystallization conditions are carried out under autogenous pressure, it is preferred (i.2) further comprises to depressurize the mixture. Either before, during, or after depressurizing, the inventive process preferably further comprises cooling the mother liquor obtained from (i.2). While there are no specific restrictions, it is preferred to cool the mother liquor to a temperature in the range of from 10 to 50° C., more preferably in the range of from 20 to 35° C.

There are no specific restrictions on how the zeolitic material is separated according to (i.3). Preferably, separating the zeolitic material obtained from (i.2) from the mother liquor according to (i.3) comprises (i.3.1) subjecting the mixture obtained from (i.2) to a solid-liquid separation method, preferably comprising a filtration method or a spraying method, obtaining a zeolitic, material having framework type CHA which comprises A and preferably Na;

(i.3.2) preferably washing the zeolitic material obtained from (i.3.1);

(i.3.3) drying the zeolitic material obtained from (i.3.1) or (i.3.2), preferably from (i.3.2).

As to (i.3.1), a spraying method may comprise spray-drying or spray-granulation. If step (i.3.2) is carried out, preferably the zeolitic material is washed with water, preferably until the washing water has a conductivity of at most 500 microSiemens, preferably at most 200 microSiemens. As to step (i.3.3.), it is preferred that the zeolitic material is dried in a gas atmosphere having a temperature in the range of from 50 to 150° C., preferably in the range of from 75 to 125° C., more preferably in the range of from 90 to 110° C. Preferably, the gas atmosphere comprises oxygen, preferably is air, lean air, or synthetic air.

Preferably, after (i.3) and before (i.4), the zeolitic material obtained from (i.3) is not subjected to a heat treatment in a gas atmosphere having a temperature of at least 450° C., preferably of at least 400° C., more preferably of at least 350° C., wherein more preferably, the zeolitic material obtained from (i.3) is not subjected to calcination.

In the context of step (i.4), the solution comprising ammonium ions according to (i.4) preferably is an aqueous solution comprising a dissolved ammonium salt, more preferably a dissolved inorganic ammonium salt, more preferably dissolved ammonium nitrate. The solution comprising ammonium ions according to (i.4) preferably has an ammonium concentration in the range of from 1 to 5 mol/l, preferably in the range of from 1.5 to 4 mol/l, more preferably in the range of from 2 to 3 mol/l.

As to (i.4), the solution comprising ammonium ions is brought in contact with the zeolitic material obtained from (i.3), preferably at a temperature of the solution in the range of from 50 to 95° C., more preferably in the range of from 60 to 90° C., more preferably in the range of from 70 to 85° C. Preferably, the solution comprising ammonium ions is brought in contact with the zeolitic material obtained from (i.3) for a period of time in the range of from 1 to 5 hours, more preferably from 2 to 4 hours, more preferably in the range of from 2.5 to 3.5 h.

As to (i.4), bringing the solution in contact with the zeolitic material according to (i.4) is preferably repeated at least once, more preferably once or twice, more preferably once.

Although not preferred in the context of the process of the present invention, as to (i.4), it is generally conceivable that the ion exchange conditions result in essentially all of the alkali metal A which is one or more of K and Cs to be exchanged with ammonium. In this context, the term "essentially all" means that at least 90%, preferably at least 95%, more preferably at least 98%, more preferably at least 99%, more preferably at least 99.5%.

In the context of (i.4), bringing the solution in contact with the zeolitic material comprises one or more of impregnating the zeolitic material with the solution and spraying the solution onto the zeolitic material, preferably impregnating the zeolitic material with the solution.

Preferably, after (i.4) and before (ii), the zeolitic material obtained from (i.4) is not subjected to a heat treatment in a gas atmosphere having a temperature of at least 450° C., preferably of at least 400° C., more preferably of at least 350° C., wherein more preferably, the zeolitic material obtained from (i.3) is not subjected to calcination.

In the context of step (ii) of the inventive process, the solution comprising ions of a transition metal M according to (ii) is preferably an aqueous solution comprising a dissolved salt of the transition metal M, more preferably a dissolved inorganic salt of the transition metal M, more preferably a dissolved nitrate of the transition metal M. Preferably the solution comprising ions of a transition metal M according to (ii) comprises or is a dissolved nitrate of the transition metal Cu.

Preferably, the solution comprising ions of a transition metal M according to (ii) has concentration of the transition metal M in the range of from 0.0005 to 1 mol/l, more preferably in the range of from 0.001 to 0.5 mol/l, more preferably in the range of from 0.002 to 0.2 mol/l.

Preferably, the solution comprising ions of a transition metal M is brought in contact with the zeolitic material obtained from (i.4) at a temperature of the solution in the range of from 10 to 40° C., more preferably in the range of from 15 to 35° C., more preferably in the range of from 20 to 30° C. Preferably, said contact is carried out for a period of time in the range of from 6 to 48 h, more preferably from 12 to 36 h, more preferably in the range of from 18 to 30 h.

Bringing the solution in contact with the zeolitic, material according to (ii) is preferably repeated at least once. Preferably, bringing the solution in contact with the zeolitic material according to (ii) comprises one or more of impregnating the zeolitic material with the solution and spraying the solution onto the zeolitic material, more preferably impregnating the zeolitic material with the solution.

In the context of step (iii) of the process of the present invention, separating the zeolitic material according to (iii) preferably comprises
 (iii.1) subjecting the mixture obtained from (ii) to a solid-liquid separation method, preferably comprising a filtration method or a spraying method, obtaining a zeolitic material having framework type CHA, comprising a transition metal M and an alkali metal A, and having a framework structure comprising a tetravalent element Y, a trivalent element X and O;
 (iii.2) preferably washing the zeolitic material obtained from (iii.1);
 (iii.3) drying the zeolitic material obtained from (iii.1) or (iii.2), preferably from (iii.2).

If step (iii.2) is carried out, the zeolitic material is preferably washed with water, preferably until the washing water has a conductivity of at most 500 microSiemens, more preferably at most 200 microSiemens.

As to step (iii.3), it is preferred that the zeolitic material is dried in a gas atmosphere having a temperature in the range of from 50 to 150° C., more preferably in the range of from 75 to 125° C., more preferably in the range of from 90 to 110° C. Preferably, the gas atmosphere comprises oxygen, more preferably is air, lean air, or synthetic air.

Preferably, the inventive process further comprises
 (iv) calcining the zeolitic material obtained from (iii), obtaining the zeolitic material having framework type CHA, comprising a transition metal M and an alkali metal A, and having a framework structure comprising a tetravalent element Y, a trivalent element X and O.

If (iv) is carried out, the zeolitic material is preferably calcined in a gas atmosphere having a temperature in the range of from 400 to 600° C., more preferably in the range of from 450 to 550° C., more preferably in the range of from 475 to 525° C. Preferably, the gas atmosphere comprises oxygen, more preferably comprises, more preferably is one or more of oxygen, air, or lean air. Generally, it may be conceivable that the zeolitic material is provided in its ammonium form, in its hydrogen form (H form), or in any other suitable cation form such as in its Na form, K form or Cs form, or combinations thereof. Preferably, the zeolitic material obtained if (iv) is carried out is in its hydrogen (H) form. If (iv) is not carried out, the zeolitic material provided is preferably in its ammonium form.

Depending on the intended use of the zeolitic material, the material, preferably obtained from (iii) or (iv) can be employed as such. Further, it is conceivable that this zeolitic, material is subjected to one or more further post-treatment steps. For example, the zeolitic material which is most preferably obtained as a powder can be suitably processed to a molding or a shaped body by any suitably method, including, but no restricted to, extruding, tabletting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titanic, zirconia, alumina, and a mixed oxide of two or more of silicon, titanium and zirconium. The weight ratio of the zeolitic material relative to the binder is generally not subject to any specific restrictions and may be, for example, in the range of from 10:1 to 1:10. According to a further example according to which the zeolitic material is used, for example, as a catalyst or as a catalyst component for treating an exhaust gas stream, for example an exhaust gas stream of an engine, it is possible that the zeolitic material is used as a component of a washcoat to be applied onto a suitable substrate, such as a wall-flow filter or the like.

The present invention further relates to a zeolitic material obtainable or obtained or preparable or prepared by a process according to a process described herein above, said process preferably further comprising calcining step (iv) as defined herein above.

The zeolitic, material of the present invention can be used for any conceivable purpose, including, but not limited to, an absorbent, an adsorbent, a molecular sieve, a catalyst, a catalyst carrier or an intermediate for preparing one or more thereof. Preferably, the zeolitic material of the present invention is used as a catalytically active material, as a catalyst, or as a catalyst component, more preferably for the selective catalytic reduction of nitrogen oxides in an exhaust gas stream, preferably an exhaust gas stream from a diesel engine. More preferably, for the conversion of a C1 compound to one or more olefins, preferably for the conversion of methanol to one or more olefins or the conversion of a synthetic gas comprising carbon monoxide and hydrogen to one or more olefins.

Further, the present invention relates to a method for selectively catalytically reducing nitrogen oxides in an exhaust gas stream, preferably an exhaust gas stream from a diesel engine, said method comprising bringing said exhaust gas stream in contact with a catalyst comprising the zeolitic material according to the present invention.

Yet further, the present invention relates to a method for selectively catalytically reducing nitrogen oxides in an exhaust gas stream, preferably an exhaust gas stream from a diesel engine, said method comprising preparing a zeolitic material by a process according to the present invention, said process preferably further comprising calcining step (iv) as defined herein above, and bringing said exhaust gas stream in contact with a catalyst comprising said zeolitic material.

The present invention also relates to a method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the zeolitic material according to the present invention, The present invention further relates to a method for catalytically converting a C1 compound to one or more olefins, preferably converting methanol to one or more olefins or converting a synthetic gas comprising carbon monoxide and hydrogen to one or more olefins, said method comprising preparing a zeolitic material by a process according to the present invention, said process preferably further comprising calcining step (iv) as defined herein above, and bringing said C1 compound in contact with a catalyst comprising said zeolitic material.

The present invention also relates to a catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the zeolitic material according to the present invention.

The present invention is further illustrated by the following set of embodiments and combinations of embodiments resulting from the dependencies and back-references as indicated. In particular, it is noted that in each instance where a range of embodiments is mentioned, for example in the context of a term such as "The zeolitic material of any one of embodiments 1 to 4", every embodiment in this range is meant to be explicitly disclosed for the skilled person, i.e. the wording of this term is to be understood by the skilled person as being synonymous to "The zeolitic material of any one of embodiments 1, 2, 3, and 4".

1. A zeolitic material having framework type CHA, comprising a transition metal M and an alkali metal A, and having a framework structure comprising a tetravalent element Y, a trivalent element X and O, wherein the transition metal M is a transition metal of groups 7 to 12 of the periodic table, A is one or more of K and Cs, Y is one or more of Si, Ge, Ti, Sn and Zr, and X is one or more of Al, B, Ga and In.

2. The zeolitic material of embodiment 1, comprising M in an amount in the range of from 0.5 to 7.5 weight-%, preferably in the range of from 1 to 6 weight-%, more preferably in the range of from 2 to 5 weight-%, calculated as elemental M and based on the total weight of the zeolitic material.

3. The zeolitic material of embodiment 1 or 2, wherein M comprises one or more of Cu and Fe, preferably Cu, wherein more preferably, M is Cu.

4. The zeolitic material of any one of embodiments 1 to 3, comprising A in an amount in the range of from 0.05 to 5 weight-%, preferably in the range of from 0.1 to 3.5 weight-%, more preferably in the range of from 0.2 to 3 weight-%, more preferably in the range of from 0.25 to 2.5 weight-%, more preferably in the range of from 0.2 to 1 weight-%, calculated as elemental A and based on the total weight of the zeolitic material.

5. The zeolitic material of any one of embodiments 1 to 4, wherein A comprises, preferably is K.

6. The zeolitic material of embodiment 5, comprising A in an amount in the range of from 0.05 to 1.5 weight-%, preferably in the range of from 0.1 to 1 weight-%, more preferably in the range of from 0.25 to 0.75 weight-%, calculated as elemental A and based on the total weight of the zeolitic material.

7. The zeolitic material of any one of embodiments 1 to 4, wherein A comprises, preferably is Cs.

8. The zeolitic material of embodiment 7, comprising A in an amount in the range of from 0.35 to 2 weight-%, preferably in the range of from 0.45 to 1.25 weight-%, calculated as elemental A and based on the total weight of the zeolitic material, or comprising A in an amount in the range of from 0.5 to 3.5 weight-%, preferably in the range of from 1 to 3 weight-%, more preferably in the range of from 1.5 to 2.5 weight-%, calculated as elemental A and based on the total weight of the zeolitic material.

9. The zeolitic material of any one of embodiments 1 to 8, wherein in the framework structure, the molar ratio of Y relative to X, calculated as $YO_2:X_2O_3$, is in the range of from 3:1 to 20:1, preferably in the range of from 4:1 to 15:1, more preferably in the range of from 5:1 to 10:1.

10. The zeolitic material of any one of embodiments 1 to 9, wherein Y comprises, preferably is, Si.
11. The zeolitic material of any one of embodiments 1 to 10, wherein X comprises, preferably is, Al.
12. The zeolitic material of any one of embodiments 1 to 11 further comprising Na.
13. The zeolitic material of embodiment 12, comprising Na in an amount in the range of from 0.05 to 1 weight-%, preferably in the range of from 0.1 to 0.75 weight-%, more preferably in the range of from 0.15 to 0.5 weight-%, more preferably in the range of from 0.15 to 0.4 weight-%, calculated as elemental Na and based on the total weight of the zeolitic material.
14. The zeolitic material of any one of embodiments 1 to 13, wherein at least 98 weight-%, preferably at least 99 weight-%, more preferably at least 99.5 weight-% of the zeolitic material consist of M, A, Y, X, O, H, and optionally Na.
15. The zeolitic material of any one of embodiments 1 to 14, wherein at least 98 weight-%, preferably at least 99 weight-%, more preferably at least 99.5 weight-% of the framework structure consist of Y, X, O, and H.
16. The zeolitic material of any one of embodiments 1 to 15, having a total amount of acid sites in the range of from 2.0 to 3.2 mmol/g, wherein the total amount of acid sites is defined as the total molar amount of desorbed ammonia per mass of the zeolitic material determined according to the temperature programmed desorption of ammonia (NH3-TPD) as described in Reference Example 1.1 herein; wherein the zeolitic material has an amount of medium acid sites in the range of from 1.0 to 1.7 mmol/g, wherein the amount of medium acid sites is defined as the amount of desorbed ammonia per mass of the zeolitic material determined according to the temperature programmed desorption of ammonia (NH3-TPD) as described in Reference Example 1.1 herein in the temperature range of from 250 to 450° C., wherein the total amount of acid sites is preferably in the range of from 2.1 to 3.1 mmol/g, more preferably in the range of from 2.2 to 3.0 mml/g, and wherein the amount of medium acid sites is preferably in the range of from 1.1 to 1.6 mmol/g, more preferably in the range of from 1.2 to 1.5 mmol/g.
17. The zeolitic material of any one of embodiments 1 to 16, exhibiting a peak having a maximum in the range of from 207 to 202 nm, determined according to UV-Vis spectroscopy as described in Reference Example 1.2 herein.
18. The zeolitic material of any one of embodiments 1 to 17, exhibiting a peak having a maximum in the range of from 1,945 to 1,950 $cm^{-1}$, a peak having a maximum in the range of from 2,245 to 2,250 cm d, a peak having a maximum in the range of from 1,925 to 1,930 $cm^{-1}$, a peak having a maximum in the range of from 1,870 to 1,880 $cm^{-1}$, and a peak having a maximum in the range of from 1,805 to 1,810 $cm^{-1}$, determined according to NO adsorption via FT-IR as described in Reference Example 1.3 herein at a pressure of 1,000 Pa.
19. The zeolitic material of any one of embodiments 1 to 18, being a calcined zeolitic material, preferably having been calcined in a gas stream comprising oxygen, preferably one or more of oxygen, air and lean air, said gas stream having a temperature in the range of from 450 to 550° C., preferably for a period in the range of from 4 to 6 h.
20. A process for preparing a zeolitic material, preferably a zeolitic material according to any one of embodiments 1 to 19, comprising
    (i) providing a zeolitic material having framework type CHA in its ammonium form, the zeolitic material comprising an alkali metal A, and having a framework structure comprising a tetravalent element Y, a trivalent element X and O, wherein A is one or more of K and Cs, Y is one or more of Si, Ge, Ti, Sn and Zr, and X is one or more of Al, B, Ga and In;
    (ii) subjecting the zeolitic material having framework type CHA in its ammonium form obtained from (i) to ion exchange conditions, comprising bringing the zeolitic material having framework type CHA in its ammonium form in contact with a solution comprising ions of a transition metal M of groups 7 to 12 of the periodic table, obtaining a mixture comprising a zeolitic material having framework type CHA, comprising a transition metal M and an alkali metal A, and having a framework structure comprising a tetravalent element Y, a trivalent element X and O;
    (iii) separating the zeolitic material from the mixture obtained in (ii).
21. The process of embodiment 20, wherein providing a zeolitic material having framework type CHA in its ammonium form according to (i) comprises
    (i.1) preparing a synthesis mixture comprising water, a source of Y, a source of X, a source of A, and preferably a source of Na;
    (i.2) subjecting the synthesis mixture prepared according to (i.1) to hydrothermal crystallization conditions comprising heating the synthesis mixture to a temperature in the range of from 150 to 200° C. and keeping the synthesis mixture at a temperature in this range under autogenous pressure, obtaining a mother liquor comprising a zeolitic material having framework type CHA which comprises A and preferably Na;
    (i.3) separating the zeolitic material obtained from (i.2) from the mother liquor;
    (i.4) subjecting the zeolitic material obtained from (i.3) to ion exchange conditions, comprising bringing a solution comprising ammonium ions in contact with the zeolitic material obtained from (i.3), obtaining a zeolitic material having framework type CHA in its ammonium form.
22. The process of embodiment 21, wherein Y is Si and the source of Y according to (i.1) comprises one or more of silica and a silicate, preferably one or more of a colloidal silica, and a fumed silica, more preferably a fumed silica.
23. The process of embodiment 21 or 22, wherein X is Al and the source of X according to
    (i.1) comprises one or more of alumina and an aluminum salt, preferably an aluminum salt, more preferably an aluminum trialkoxide.
24. The process of any one of embodiments 21 to 23, wherein the source of A comprises one or more of a halide of A, a nitrate of A, and a hydroxide of A, preferably a hydroxide of A.
25. The process of any one of embodiments 21 to 24, wherein the source of Na comprises one or more of a sodium silicate, a sodium aluminate, a sodium halide and sodium hydroxide, preferably sodium hydroxide.
26. The process of any one of embodiments 1 to 25, wherein in the synthesis mixture prepared according to (i.1), the molar ratio of the source of Y relative to the source of X, calculated as $YO_2:X_2O$ is in the range of from 1:0.02 to 1:0.15, preferably in the range of from 1:0.03 to 1:0.1, more preferably in the range of from 1:0.04 to 1:0.08;

the molar ratio of the source of Y relative to the source of A, calculated as $YO_2:A_2O$, is in the range of from 1:0.002 to 1:0.2, preferably in the range of from 1:0.005 to 1:0.15, more preferably in the range of from 1:01 to 1:0.1;

the molar ratio of the source of Y relative to the water, calculated as $YO_2:H_2O$, is in the range of from 1:75 to 1:125, preferably in the range of from 1:85 to 1:115, more preferably in the range of from 1:95 to 1:105;

the molar ratio of the source of Y relative to the source of Na, calculated as $YO_2:Na_2O$, is in the range of from 1:0.05 to 1:0.75, preferably in the range of from 1:0.1 to 1:0.5, more preferably in the range of from 1:0.15 to 1:0.4.

27. The process of any one of embodiments 21 to 26, wherein the synthesis mixture prepared according to (i.1) further comprises a seed crystal material comprising a zeolitic material having framework type CHA, preferably a zeolitic material having framework type CHA and having a framework structure comprising the tetravalent element Y, the trivalent element X and O, more preferably a zeolitic material having framework type CHA, comprising sodium and having a framework structure comprising the tetravalent element Y, the trivalent element X and O.

28. The process of embodiment 27, wherein the synthesis mixture prepared according to (i.1) comprises the seed crystal material in an amount in the range of from 10 to 30 weight-%, preferably in the range of from 15 to 25 weight-%, more preferably in the range of from 17.5 to 22.5 weight-%, based on the total weight of Si, calculated as $SiO_2$, comprised in the synthesis mixture.

29. The process of any one of embodiments 21 to 28, wherein the synthesis mixture prepared according to (i.1) contains no framework type CHA directing organotemplate compound.

30. The process of any one of embodiments 21 to 29, wherein subjecting the synthesis mixture prepared according to (i.1) to hydrothermal crystallization conditions according to (i.2) comprises heating the synthesis mixture to a temperature in the range of from 155 to 190° C., preferably in the range of from 160 to 180° C., more preferably in the range of from 165 to 175° C.

31. The process of any one of embodiments 21 to 30, wherein subjecting the synthesis mixture prepared according to (i.1) to hydrothermal crystallization conditions according to (i.2) comprises keeping the synthesis mixture at the temperature in this range under autogenous pressure for a period of time in the range of from 6 h to 5 d, preferably in the range of from 12 h to 4 d, more preferably in the range of from 1 d to 3 d.

32. The process of any one of embodiments 21 to 31, wherein subjecting the synthesis mixture prepared according to (i.1) to hydrothermal crystallization conditions according to (i.2) is carried out in an autoclave.

33. The process of any one of embodiments 21 to 32, wherein separating the zeolitic material obtained from (i.2) from the mother liquor according to (i.3) comprises (1.3.1) subjecting the mixture obtained from (i.2) to a solid-liquid separation method, preferably comprising a filtration method or a spraying method, obtaining a zeolitic material having framework type CHA which comprises A and preferably Na;

(i.3.2) preferably washing the zeolitic material obtained from (i.3.1);

(i.3.3) drying the zeolitic material obtained from (i.3.1) or (i.3.2), preferably from (i.3.2), 34. The process of embodiment 33, wherein according to (i.3.2), the zeolitic material is washed with water, preferably until the washing water has a conductivity of at most 500 microSiemens, preferably at most 200 microSiemens.

35. The process of embodiment 33 or 34, wherein according to (i.3.3), the zeolitic material is dried in a gas atmosphere having a temperature in the range of from 50 to 150° C., preferably in the range of from 75 to 125° C., more preferably in the range of from 90 to 110° C.

36. The process of embodiment 35, wherein the gas atmosphere comprises oxygen, preferably is air, lean air, or synthetic air.

37. The process of any one of embodiments 21 to 36, wherein after (i.3) and before (i.4), the zeolitic material obtained from (i.3) is not subjected to a heat treatment in a gas atmosphere having a temperature of at least 450° C., preferably of at least 400° C., more preferably of at least 350° C., wherein more preferably, the zeolitic material obtained from (i.3) is not subjected to calcination.

38. The process of any one of embodiments 21 to 37, wherein the solution comprising ammonium ions according to (i.4) is an aqueous solution comprising a dissolved ammonium salt, preferably a dissolved inorganic ammonium salt, more preferably dissolved ammonium nitrate.

39. The process of any one of embodiments 21 to 38, wherein the solution comprising ammonium ions according to (i.4) has an ammonium concentration in the range of from 1 to 5 mol/l, preferably in the range of from 1.5 to 4 mol/l, more preferably in the range of from 2 to 3 mol/l.

40. The process of any one of embodiments 21 to 39, wherein according to (i,4), the solution comprising ammonium ions is brought in contact with the zeolitic material obtained from (i.3) at a temperature of the solution in the range of from 50 to 95° C., preferably in the range of from 60 to 90° C., more preferably in the range of from 70 to 85° C.

41. The process of embodiment 40, wherein the solution comprising ammonium ions is brought in contact with the zeolitic material obtained from (i.3) for a period of time in the range of from 1 to 5 hours, preferably from 2 to 4 hours, more preferably in the range of from 2.5 to 3.5 h.

42. The process of any one of embodiments 21 to 41, wherein bringing the solution in contact with the zeolitic material according to (i.4) is repeated at least once, preferably once or twice, more preferably once.

43. The process of any one of embodiments 21 to 42, wherein bringing the solution in contact with the zeolitic material according to (i.4) comprises one or more of impregnating the zeolitic material with the solution and spraying the solution onto the zeolitic material, preferably impregnating the zeolitic material with the solution.

44. The process of any one of embodiments 21 to 43, wherein after (i.4) and before (ii), the zeolitic material obtained from (i.4) is not subjected to a heat treatment in a gas atmosphere having a temperature of at least 450° C., preferably of at least 400° C., more preferably of at least 350° C., wherein more preferably, the zeolitic material obtained from (i.3) is not subjected to calcination.

45. The process of any one of embodiments 20 to 44, wherein the solution comprising ions of a transition metal M according to (ii) is an aqueous solution comprising a dissolved salt of the transition metal M, preferably a dissolved inorganic salt of the transition metal M, more preferably a dissolved nitrate of the transition metal M.

46. The process of any one of embodiments 20 to 45, wherein the solution comprising ions of a transition metal M according to (ii) has concentration of the transition metal M in the range of from 0.0005 to 1 mol/l, preferably in the range of from 0.001 to 0.5 mol/l, more preferably in the range of from 0.002 to 0.2 mol/l.

47. The process of any one of embodiments 20 to 46, wherein according to (ii), the solution comprising ions of a transition metal M is brought in contact with the zeolitic material obtained from (i.4) at a temperature of the solution in the range of from 10 to 40° C., preferably in the range of from 15 to 35° C., more preferably in the range of from 20 to 30° C.

48. The process of embodiment 47, wherein the solution comprising ions of a transition metal M is brought in contact with the zeolitic material obtained from (i.4) for a period of time in the range of from 6 to 48 h, preferably from 12 to 36 h, more preferably in the range of from 18 to 30 h.

49. The process of any one of embodiments 20 to 48, wherein bringing the solution in contact with the zeolitic material according to (ii) is repeated at least once.

50. The process of any one of embodiments 20 to 49, wherein bringing the solution in contact with the zeolitic material according to (ii) comprises one or more of impregnating the zeolitic material with the solution and spraying the solution onto the zeolitic material, preferably impregnating the zeolitic material with the solution.

51. The process of any one of embodiments 20 to 50, wherein separating the zeolitic material according to (iii) comprises
    (iii.1) subjecting the mixture obtained from (ii) to a solid-liquid separation method, preferably comprising a filtration method or a spraying method, obtaining a zeolitic material having framework type CHA, comprising a transition metal M and an alkali metal A, and having a framework structure comprising a tetravalent element Y, a trivalent element X and O;
    (iii.2) preferably washing the zeolitic material obtained from (iii.1);
    (iii.3) drying the zeolitic material obtained from (iii.1) or (iii.2), preferably from (iii.2).

52. The process of embodiment 51, wherein according to (iii.2), the zeolitic material is washed with water, preferably until the washing water has a conductivity of at most 500 microSiemens, preferably at most 200 microSiemens.

53. The process of embodiment 51 or 52, wherein according to (iii.3), the zeolitic material is dried in a gas atmosphere having a temperature in the range of from 50 to 150° C., preferably in the range of from 75 to 125° C., more preferably in the range of from 90 to 110° C.

54. The process of embodiment 53, wherein the gas atmosphere comprises oxygen, preferably is air, lean air, or synthetic air.

55. The process of any one of embodiments 20 to 54, further comprising
    (iv) calcining the zeolitic material obtained from (iii), obtaining the zeolitic material having framework type CHA, comprising a transition metal M and an alkali metal A, and having a framework structure comprising a tetravalent element Y, a trivalent element X and O.

56. The process of embodiment 55, wherein according to (iv), the zeolitic material is calcined in a gas atmosphere having a temperature in the range of from 400 to 600° C., preferably in the range of from 450 to 550° C., more preferably in the range of from 475 to 525° C.

57. The process of embodiment 56, wherein the gas atmosphere comprises oxygen, preferably is one or more of oxygen, air, or lean air.

58. A zeolitic material, obtainable or obtained or preparable or prepared by a process according to any one of embodiments 20 to 57, preferably according to any one of embodiments 55 to 57.

59. Use of a zeolitic material according to any one of embodiments 1 to 19 or 58 as a catalytically active material, as a catalyst, or as a catalyst component.

60. The use of embodiment 59 for the selective catalytic reduction of nitrogen oxides in an exhaust gas stream, preferably an exhaust gas stream from a diesel engine.

61. The use of embodiment 59 for the conversion of a C1 compound to one or more olefins, preferably for the conversion of methanol to one or more olefins or the conversion of a synthetic gas comprising carbon monoxide and hydrogen to one or more olefins.

62. A method for selectively catalytically reducing nitrogen oxides in an exhaust gas stream, preferably an exhaust gas stream from a diesel engine, said method comprising bringing said exhaust gas stream in contact with a catalyst comprising the zeolitic material according to any one of embodiments 1 to 19 or 58.

63. A method for selectively catalytically reducing nitrogen oxides in an exhaust gas stream, preferably an exhaust gas stream from a diesel engine, said method comprising preparing a zeolitic material by a process according to any one of embodiments 20 to 57, preferably 55 to 57, and bringing said exhaust gas stream in contact with a catalyst comprising said zeolitic material.

64. A method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the zeolitic material according to any one of embodiments 1 to 19 or 58.

65. A method for catalytically converting a C1 compound to one or more olefins, preferably converting methanol to one or more olefins or converting a synthetic gas comprising carbon monoxide and hydrogen to one or more olefins, said method comprising preparing a zeolitic material by a process according to any one of embodiments 20 to 57, preferably 55 to 57, and bringing said C1 compound in contact with a catalyst comprising said zeolitic material.

66. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the zeolitic, material according to any one of embodiments 1 to 19 or 58.

The present invention is further illustrated by the following Reference Examples, Examples, and Comparative Examples.

EXAMPLES

Reference Example 1.1: Determination of NH3-TPD Profiles

Temperature-programmed desorption of ammonia (NH3-TPD) profiles were recorded on a Multitrack TPD equipment (Japan BEL). Typically, 25 mg catalyst were pretreated at 873 K in a He flow (50 mL/min) for 1 h and then cooled to 373 K. Prior to the adsorption of NH3, the sample was evacuated at 373 K for 1 h. Approximately 2500 Pa of NH3 were allowed to make contact with the sample at 373 K for 30 min. Subsequently, the sample was evacuated to remove weakly adsorbed $NH_3$ at the same temperature for 30 min. Finally, the sample was heated from 373 to 873 K at a ramping rate of 10 K/min in a He flow (50 mL/min). A thermal conductivity detector (TCD) was used to monitor desorbed NH3.

Reference Example 1.2: Determination of UV-Vis Spectra

UVvis diffuse reflectance spectra were recorded on a V-650DS spectrometer (JASCO). The diffuse reflectance spectra were converted into the absorption spectra by using the Kubelka Munk function.

Reference Example 1.3: Determination of FT-IR Spectra

FTIR spectra were obtained at a resolution of 4 cm$^{-1}$ using a Jasco FTIR 4100 spectrometer equipped with a TGS detector. The powdered samples (about 30 mg) were pelletized into a self-supporting disk of 1 cm in diameter, which was held in a glass cell. After evacuation at 500° C. for 2 h, the sample was cooled back to ambient temperature prior to background spectra acquisition. Then NO was introduced into the cell in a pulse mode fashion (about 5 Pa for the first pulse, until total pressure in the IR cell reached about 1,000 Pa). After equilibrium NO pressure was reached after each pulse of NO, an IR spectrum was obtained.

Reference Example 1.4: Elemental Analysis

Elemental analyses were performed on an inductively coupled plasma-atomic emission spectrometer (ICP-AES, Shimadzu ICPE-9000).

Reference Example 2: Preparation of Seed Crystalline Material 2.31 g of Y zeolite (CBV712, Zeolyst) were added to an aqueous solution containing 0.28 g of NaOH (97%, from Wako Chemicals) and 1.42 g of trimethyladamantylammonium hydroxide (TMAdaOH) (7.28 g of TMAdaOH aqueous 20 weight-%), with stirring for 1 h. The molar composition of the resultant gel was 1 SiO$_2$:0.083 Al$_2$O$_3$:0.1 NaOH:0.2 TMAdaOH:10 H$_2$O. The thus prepared mother gel was crystallized in an autoclave at 150° C. for 2 days under tumbling condition (40 r.p.m.). The crystalline solid product, a zeolitic material having framework type CHA, was recovered by filtration, washed with distilled water, dried overnight at 100° C., and calcined at 600° C. for 6 h under air.

Reference Example 3: Preparation of a Comparative Zeolitic Material—a Zeolitic Material Having Framework Type CHA and Comprising Cu a) 277 kg of a 20 weight-% aqueous solution of cyclohexyltrimethylammonium hydroxide (CHTMAOH) and 78 kg of a 25 weight-% aqueous solution of tetramethylammonium hydroxide (TMAOH) were placed in an autoclave after which 34.8 kg of aluminumtriisopropylate were added under stirring at 50 r.p.m., and further stirred at that rate until the aluminumtriisopropylate had entirely dissolved. 358 kg of a 40 weight-% solution of colloidal silica (Ludox® AS40) were then added, and the mixture stirred an additional 10 min. Finally, 5.7 kg of SSZ-13 zeolite (prepared according to Reference Example 2) were added to the mixture under stirring, wherein the pH of the resulting mixture was measured to be 14.24. The mixture was then crystallized at 170° C. for 18 h, wherein the mixture was first progressively heated to the reaction temperature using a constant temperature ramp over a period of 7 h. A white suspension having a pH of 13.14 was obtained, which was filtered and the solid washed with distilled water until substantial electroneutrality of the washwater was achieved. The resulting solid was dried and subsequently calcined at 550° C. for 5 h under air, obtaining a zeolitic material having framework type CHA in powder form. Elemental analysis of the product afforded (in weight-%): Si: 34.0; Al: 2.6; Na: 0.12. 1.3 kg of distilled water and 202.2 g of the calcined zeolitic material were placed in a 4 L receptacle and heated to 60° C. and held at that temperature for 30 min. Subsequently, 20.13 g of copper(II) acetate and 2.22 g of 70% acetic acid were added and the mixture further heated at 60° C. for 1 h under constant stirring of the mixture at 200 r.p.m. Heating was then discontinued, and 975 g of distilled water were added to the mixture which was then filtered and washed with distilled water until the wastewater displayed a conductivity of 138 microSiemens. The filter cake was then dried over night at 120° C. affording 208 g of copper ion exchanged zeolitic material having framework type CHA. Elemental analysis of the copper ion-exchanged product afforded (in weight-%): Si: 49.0; Al: 3.1; Cu: 2.2; Na: 0.02. The product is also referred to herein as "Cu(2.2)-CHA (BASF)-15.8".

b) Another material was prepared according to the process above, however with a Si:Al ratio of 12.2 and a Cu content of 2.4 weight-%. This product is also referred to herein as "Cu(2.4)-CHA(BASF)-12.2".

Example 1: Preparation of a Zeolitic Material of the Present Invention Comprising K

1.1 Template-Free Preparation of a Zeolitic Material Having Framework Type CHA 0.817 g aluminum triisopropylate (Al(OiPr)$_3$, >99.9%, from Kanto Chemical) were added to an aqueous solution containing 0.96 g NaOH (>99%; from Wako Chemicals) and 0.224 g KOH (>85%, from Wako Chemicals) with stirring for 1 h. Then, 2.4 g fumed silica (Cab-O-Si M5, from Cabot) were added to the mixture and stirred for 1 h. The molar composition of the resultant gel was 1 SiO$_2$:0.1 Al(OiPr)$_3$: 0.6 NaOH:0.1 KOH:100 H$_2$O. Then, 0.48 g calcined seed crystalline material prepared as described in Reference Example 2 above (20 weight-% based on silica) were added to the mixture. The thus prepared mother gel was crystallized in an autoclave at 170° C. for 2 days under tumbling condition (20 r.p.m.). The solid crystalline product, a zeolitic material having framework type CHA, was recovered by filtration, washed with distilled water, and dried overnight at 100° C. in air.

b) 1 g of the zeolitic material obtained according to a) was treated with 100 mL aqueous 2.5 M NH$_4$NO$_3$ at 80° C. for 3 h twice to obtain the ammonium form of the zeolitic material. The product is also referred to herein as "NH4-TF-SSZ-13(K)".

c) The zeolitic material in it ammonium form obtained according to b) was calcined at 500° C. for 5 h under air to obtain the H-form of the zeolitic, material, also referred to herein as "H-TF-SSZ-13(K)".

The composition of the zeolitic materials, analyzed by elemental analysis according to Reference Example 1.4, was as follows:

TABLE 1

Composition of the zeolitic materials prepared according to Example 1.1

| Zeolitic material according to | Na content/ weight-% | Na exchange level/% [1] | K content/ weight-% | K exchange level/% [1] |
|---|---|---|---|---|
| Example 1.1 a) | 4.0 | — | 4.7 | — |
| Example 1.1 b) | 0.3 | 92.5 | 0.5 | 89.4 |

[1] ion exchange level/% = {1 − [(ion content after ammonium exchange/weight-%)/(ion content before ammonium exchange/weight-%)]} * 100

1.2 Preparation of a Cu Containing Zeolitic Material Having Framework Type CHA Cu(NO$_3$)$_3$×3H$_2$O (>99%, from Wako Chemicals) was used as Cu source. 1 g of NH4-TF-SSZ-13(K) prepared according the 1.1 b) above was ion-exchanged with 100 g aqueous 0.005, 0.1 and 0.2 M 2 M Cu(NO$_3$)$_3$ at room temperature for 24 h. The solid product was recovered by filtration, washed with distilled water, dried overnight at 100° C., and calcined at 500° C. for 5 h under air. The product is also referred to herein as "Cu-TF-SSZ-13(K)".

The composition of the zeolitic materials, analyzed by elemental analysis according to Reference Example 1.4, was as follows:

TABLE 2

Composition of the zeolitic materials prepared according to Example 1.2

| Zeolitic material | Ion exchange conditions | SiO$_2$/ Al$_2$O$_3$ (Si/Al) | Si/ Cu | Cu/ Al | Content Cu/ weight-% | Content K/ weight-% | Content Na/ weight-% |
|---|---|---|---|---|---|---|---|
| Cu(2.7)-TF-SSZ-13(K) | 0.005M | 7.4 (3.7) | 30.8 | 0.12 | 2.7 | 0.3 | 0.3 |
| Cu(3.8)-TF-SSZ-13(K) | 0.01M | 7.4 (3.7) | 21.4 | 0.17 | 3.8 | 0.3 | 0.3 |
| Cu(4.8)-TF-SSZ-13(K) | 0.02M | 7.4 (3.7) | 16.7 | 0.22 | 4.8 | 0.4 | 0.3 |

The UV-Vis spectra of the three materials are shown in FIG. 1. According to the spectra, the Cu is well-dispersed or exists as isolated ions at the exchange sites.

In FIGS. 3, 4, and 5, the NO adsorption FT-IR spectra of the three materials are shown. According to the spectra, the Cu, as Cu$^{2+}$, is mainly located in the faces of the 6 MR (1947 cm$^{-1}$, 1929 cm$^{-1}$), and the ratio [Cu$^{2+}$]/[Cu$^+$] is high.

In FIG. 9, the NH3-TPD profiles of the three materials are shown, compared to the NH3-TPD profile of the zeolitic material prepared according to example 1.1 c) (zeolitic material, calcined, H form). According to the profiles, the Cu ions shows medium acid strength (reference is made to peak III, and with increasing Cu content, the number of the weak acid sites increased (peak II). The following results were obtained from the profiles:

TABLE 3

Results from the NH3-TPD profiles of the zeolitic material prepared according to Example 1.2 and Example 1.1 c)

| Zeolitic material | peak I/ mmol/g (° C.) | peak II/ mmol/g (° C.) | peak III/ mmol/g (° C.) | peak IV/ mmol/g (° C.) |
|---|---|---|---|---|
| H-TF-SSZ-13(K) | 0.303 (167) | 0.432 (203) | 0.496 (325) | 0.473 469 |
| Cu(2.7)-TF-SSZ-13(K) | 0.261 (166) | 0.289 (201) | (1.236) (309) | 0.635 (473) |
| Cu(3.8)-TF-SSZ-13(K) | 0.352 (171) | 0.542 (227) | 1.353 (344) | 0.515 (492) |
| Cu(4.8)-TF-SSZ-13(K) | 0.364 (173) | 0.603 (234) | 1.370 (354) | 0.425 (501) |

Example 2: Preparation of a Zeolitic Material of the Present Invention Comprising Cs 2.1 Template-free preparation of a zeolitic material having framework type CHA 0.817 g aluminum triisopropylate (Al(OiPr)$_3$, >99.9%, from Kanto Chemical) were added to an aqueous solution containing 0.64 g NaOH (>99%; from Wako Chemicals) and 0.672 g CsOH×H$_2$O (>99.95%, from Sigma-Aldrich) with stirring for 1 h. Then, 2.4 g fumed silica (Cab-O-Sil® M5, from Cabot) were added to the mixture and stirred for 1 h. The molar composition of the resultant gel was 1 SiO$_2$:0.1 Al(OiPr)$_3$:0.4 NaOH:0.1 CsOH: 100 H$_2$O. Then, 0.48 g calcined seed crystalline material prepared as described in Reference Example 2 above (20 weight-% based on silica) were added to the mixture. The thus prepared mother gel was crystallized in an autoclave at 170° C. for 2 days under tumbling condition (20 r.p.m.). The solid crystalline product, a zeolitic material having framework type CHA, was recovered by filtration, washed with distilled water, and dried overnight at 100° C. in air.

b) 1 g of the zeolitic material obtained according to a) was treated with 100 mL aqueous 2.5 M NH$_4$NO$_3$ at 80° C. for 3 h twice to obtain the ammonium form of the zeolitic material. The product is also referred to herein as "NH4-TF-SSZ-13(Cs)".

c) The zeolitic material in it ammonium form obtained according to b) was calcined at 500° C. for 5 h under air to obtain the H-form of the zeolitic material, also referred to herein as "H-TF-SSZ-13(Cs)".

The composition of the zeolitic materials, analyzed by elemental analysis according to Reference Example 1.4, was as follows:

TABLE 4

Composition of the zeolitic materials prepared according to Example 2.1

| Zeolitic material according to | Na content/ weight-% | Na exchange level/% [1] | Cs content/ weight-% | Cs exchange level/% [1] |
|---|---|---|---|---|
| Example 2.1 a) | 3.4 | — | 10.7 | — |
| Example 2.1 b) | 0.3 | 91.2 | 2.0 | 81.3 |

[1] ion exchange level/% = {1 − [(ion content after ammonium exchange/weight-%)/(ion content before ammonium exchange/weight-%)]} * 100

2.2 Preparation of a Cu Containing Zeolitic Material Having Framework Type CHA Cu(NO$_3$)$_3$×3H$_2$O (>99%, from Wako Chemicals) was used as Cu source. 1 g of NH4-TF-SSZ-13(Cs) prepared according the 2.1 b) above was ion-exchanged with 100 g aqueous 0.005, 0.01 and 0.02 M Cu(NO$_3$)$_3$ at room temperature for 24 h. The solid product was recovered by filtration, washed with distilled water, dried overnight at 100° C., and calcined at 500° C. for 5 h under air. The product is also referred to herein as "Cu-TF-SSZ-13(Cs)".

The composition of the zeolitic materials, analyzed by elemental analysis according to Reference Example 1.4, was as follows:

TABLE 5

Composition of the zeolitic materials prepared according to Example 2.2

| Zeolitic material | Ion exchange conditions | SiO$_2$/ Al$_2$O$_3$ (Si/Al) | Si/ Cu | Cu/ Al | Content Cu/ weight-% | Content Cs/ weight-% | Content Na/ weight-% |
|---|---|---|---|---|---|---|---|
| Cu(2.6)-TF-SSZ-13(Cs) | 0.005M | 8.4 (4.2) | 31.6 | 0.13 | 2.6 | 0.7 | 0.2 |
| Cu(3.8)-TF-SSZ-13(Cs) | 0.01M | 8.4 (4.2) | 22.5 | 0.19 | 3.8 | 0.6 | 0.2 |
| Cu(4.2)-TF-SSZ-13(Cs) | 0.02M | 8.4 (4.2) | 19.9 | 0.21 | 4.2 | 0.7 | 0.2 |

The UV-Vis spectra of the three materials are shown in FIG. 2. Clearly, the Cu is well-dispersed or exists as isolated ions at the exchange sites. In FIGS. 6, 7, and 8, the NO adsorption FT-IR spectra of the three materials are shown. According to the spectra, the Cu, as Cu$^{2+}$, is mainly located in the faces of the 6 MR (1947 cm$^{-1}$, 1929 cm$^{-1}$), and the ratio [Cu$^{2+}$]/[Cu$^{+}$] is high. In FIG. 10, the NH3-TPD profiles of the three materials are shown, compared to the NH3-TPD profile of the zeolitic material prepared according to example 2.1 c) (zeolitic material, calcined, H form). According to the profiles, the Cu ions shows medium acid strength (reference is made to peak III, and with increasing Cu content, the number of the weak acid sites increased (peak II). The following results were obtained from the profiles:

TABLE 6

Results from the NH3-TPD profiles of the zeolitic material prepared according to Example 2.2 and Example 2.1 c)

| Zeolitic material | peak I/ mmol/g (° C.) | peak II/ mmol/g (° C.) | peak III/ mmol/g (° C.) | peak IV/ mmol/g (° C.) |
|---|---|---|---|---|
| H-TF-SSZ-13(Cs) | 0.391 (170) | 0.285 (206) | 0.491 (334) | 0.579 (470) |
| Cu(2.6)-TF-SSZ-13(Cs) | 0.460 (172) | 0.462 (231) | (1.177) (352) | 0.544 (489) |
| Cu(3.8)-TF-SSZ-13(Cs) | 0.379 (171) | 0.566 (240) | 1.345 (361) | 0.479 (496) |
| Cu(4.2)-TF-SSZ-13(Cs) | 0.365 (173) | 0.596 (233) | 1.444 (356) | 0.481 (500) |

Example 3: Catalytic Testing of the Zeolitic Materials of the Present Invention Based on the zeolitic powder materials prepared according to the Examples above, catalyst moldings were prepared by mixing the respective powder material with a milled alumina slurry (Puralox® TM 100/150) (weight ratio of zeolitic material:alumina=70:30). Under stirring, the moldings were dried and calcined for 1 h at 550° C. The moldings were then crushed and sieved to as particle size of 250-500 micrometer. For the subsequent tests, respectively fresh and aged Cu containing materials were used. For ageing, the crushed and sieved particles were subjected for 6 h to air comprising 10 volume-% water at 750° C. The materials used were:

Cu(2.4)-CHA(BASF)-12.2 (see Reference Example 3 b) hereinabove)
    Cu(2.7)-TF-SSZ-13(K) (see Example 1, Table 2 hereinabove)
    Cu(2.6)-TF-SSZ-13(Cs) (see Example 2, Table 5 hereinabove)

The moldings comprising the zeolitic materials were subjected to a selective catalytic reduction test. For this purpose, the respectively obtained fresh and aged samples (170 mg each) were diluted with 1 mL corundum having the same particle size as the samples. A given sample was exposed to a feed stream (500 ppm NO, 500 ppm NH$_3$, 5% H$_2$O, 10% O$_2$, balance He) at a gas hourly space velocity of 80,000 h$^{-1}$, at temperatures of the feed stream of 150° C., 200° C., 250° C., 300° C., 350° C., 400° C., 450° C., 500° C., and 550° C. Reference is made to FIG. 11 showing the NO conversion as a function of the temperature of the gas stream for the fresh samples, and to FIG. 12 showing the NO conversion as a function of the temperature of the gas stream for the aged samples.

From FIG. 11, it can be derived that in the temperature range of from 200 to 550° C., both the fresh inventive materials Cu(2.7)-TF-SSZ-13(K) and Cu(2.6)-TF-SSZ-13 (Cs) show either the same or a significantly better NO conversion than the comparative fresh material Cu(2.4)-CHA(BASF)-12.2. In particular Cu(2.6)-TF-SSZ-13(Cs) shows a very high NO conversion over this entire temperature range, and Cu(2.7)-TF-SSZ-13(K) a slightly decreased yet still remarkable NO conversion.

From FIG. 12, it an be derived that in the temperature range of from 250 to 550° C., both the aged inventive materials Cu(2.7)-TF-SSZ-13(K) and Cu(2.6)-TF-SSZ-13 (Cs) show either the same or a better NO conversion than the comparative aged material Cu(2.4)-CHA(BASF)-12.2. Again, starting from a temperature of 300° C., Cu(2.6)-TF-SSZ-13(Cs) shows the best NO conversion, and Cu(2.7)-TF-SSZ-13(K) a slightly decreased yet still remarkable NO conversion.

SHORT DESCRIPTION OF THE FIGURES

Figure 1:
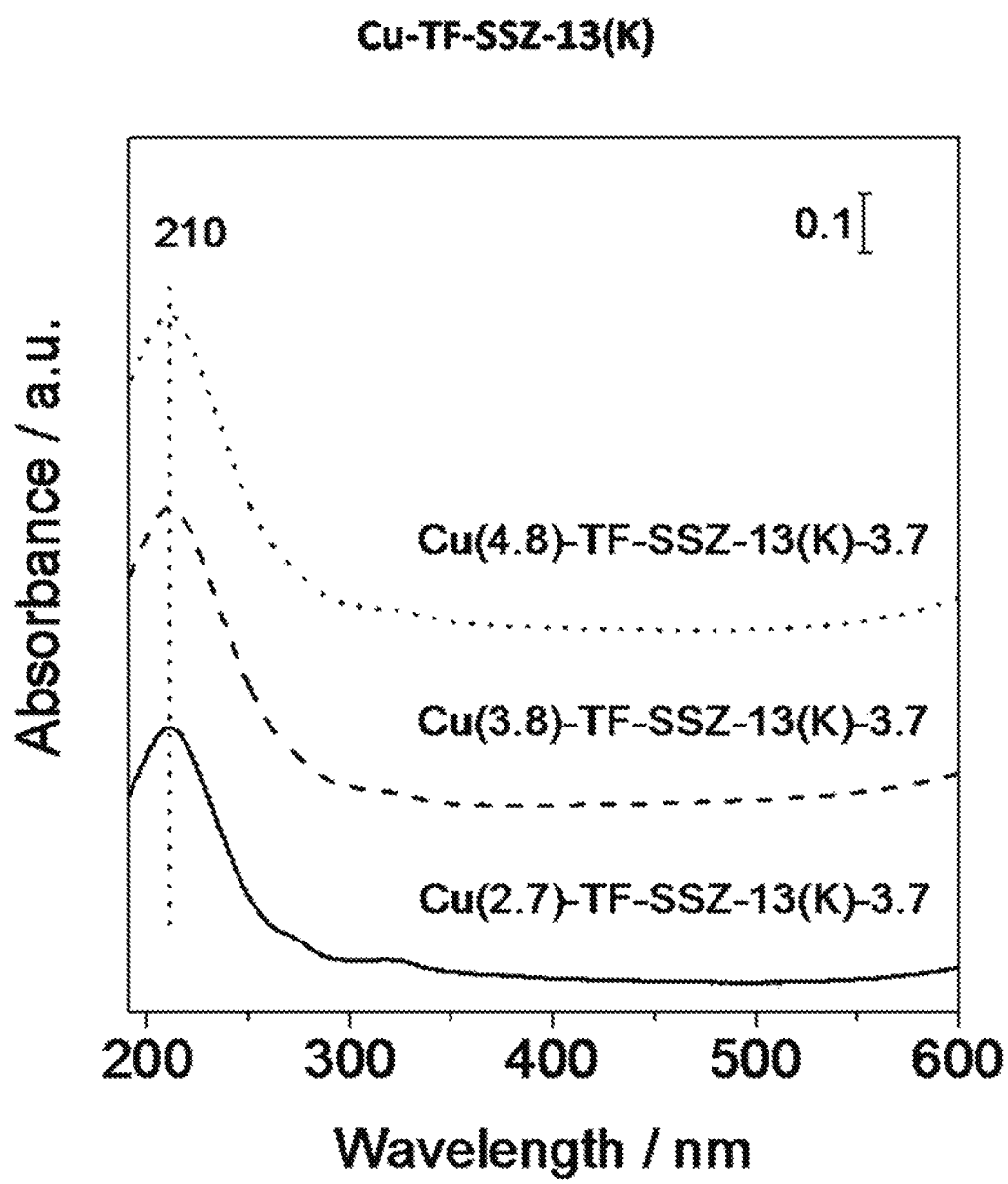
FIG. 1 shows the UV-Vis spectra of the three zeolitic materials prepared according to Example 1.2.
Figure 2:
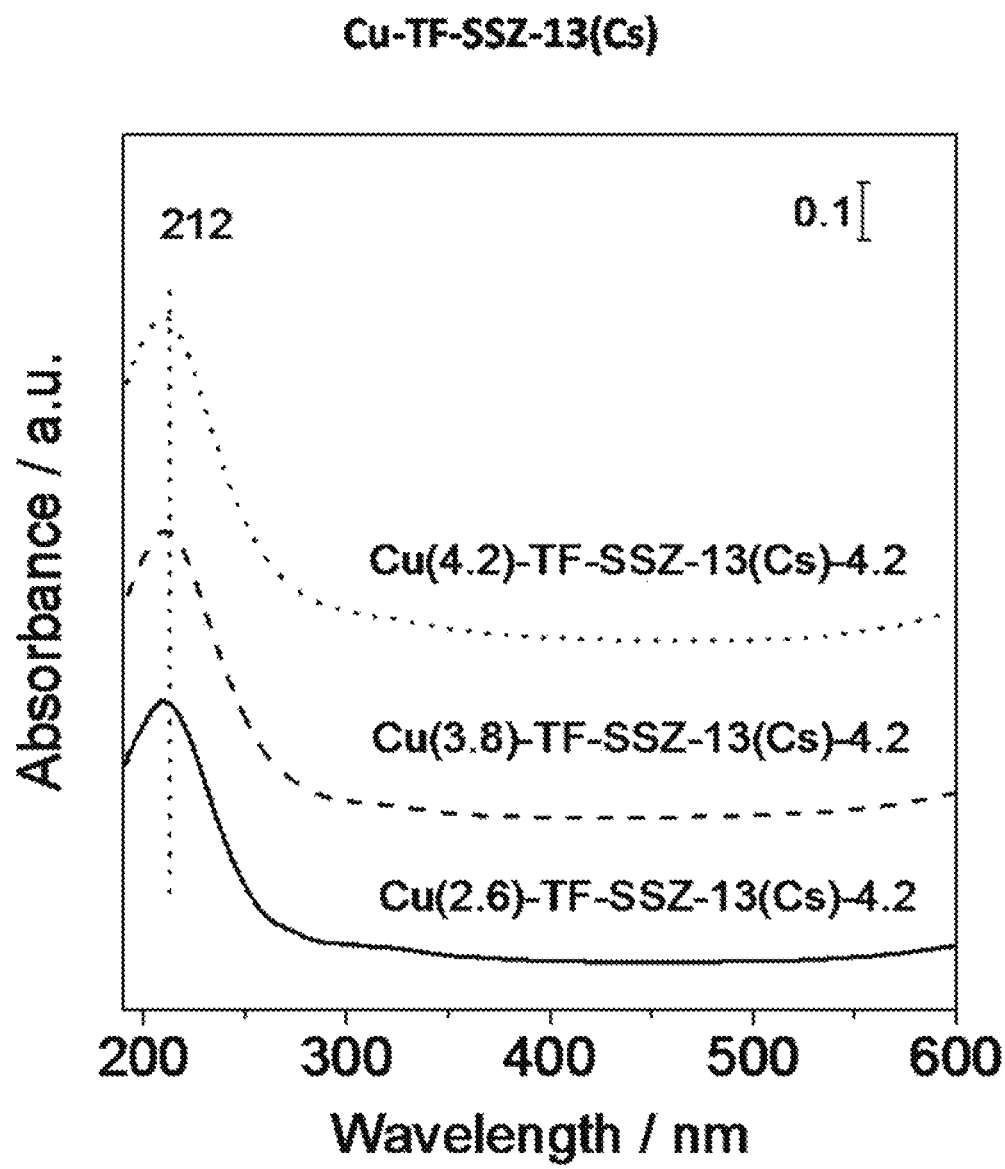
FIG. 2 shows the UV-Vis spectra of the three zeolitic materials prepared according to Example 2.2.
Figure 3:
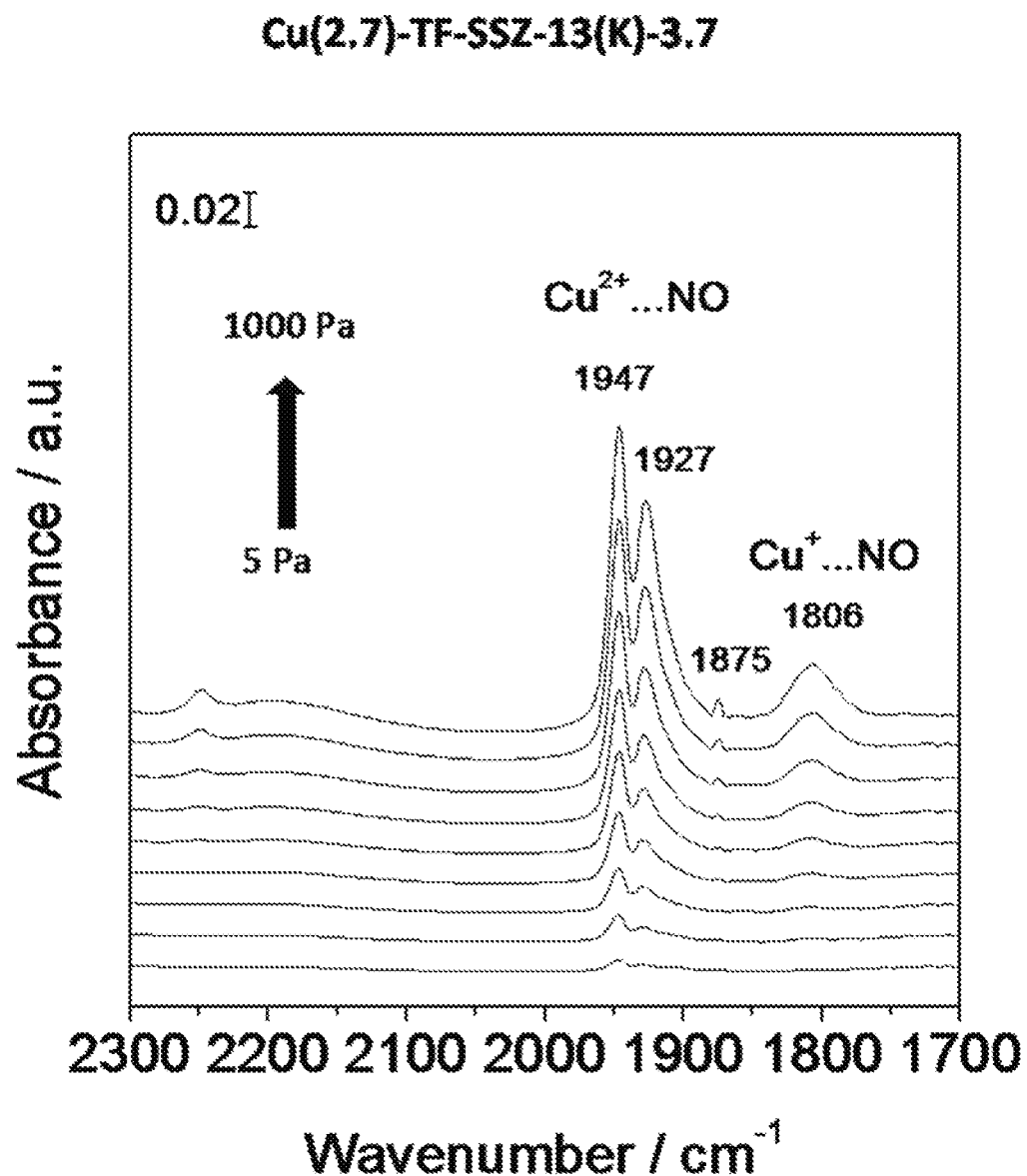
FIG. 3 shows the shows the UV-Vis spectra of a zeolitic materials prepared according to Example 1.2 (Cu(2.7)-TF-SSZ13(K)-3.7).
Figure 4:
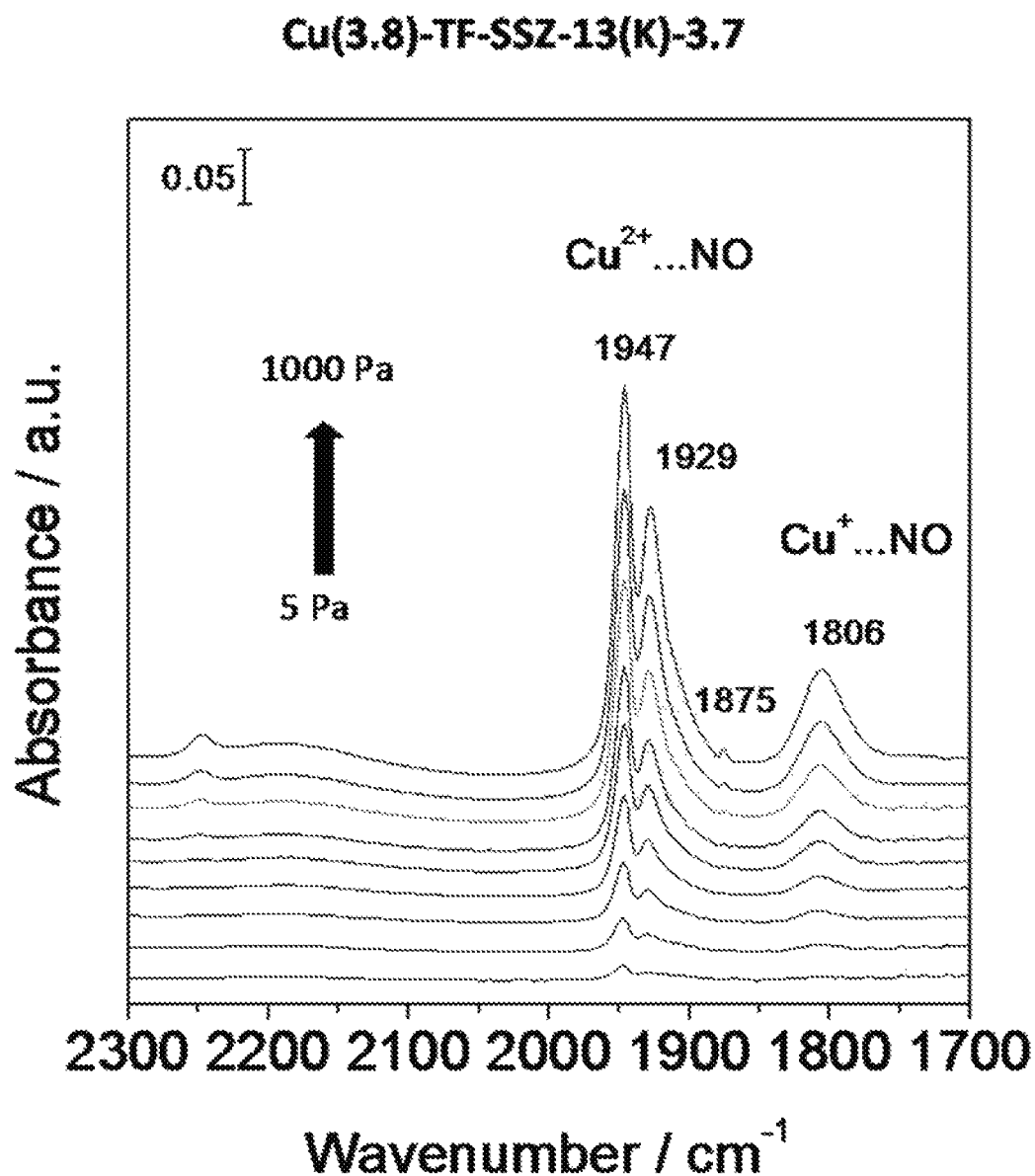
FIG. 4 shows the shows the UV-Vis spectra of a zeolitic materials prepared according to Example 1.2 (Cu(3.8)-TF-SSZ13(K)-3.7).
Figure 5:
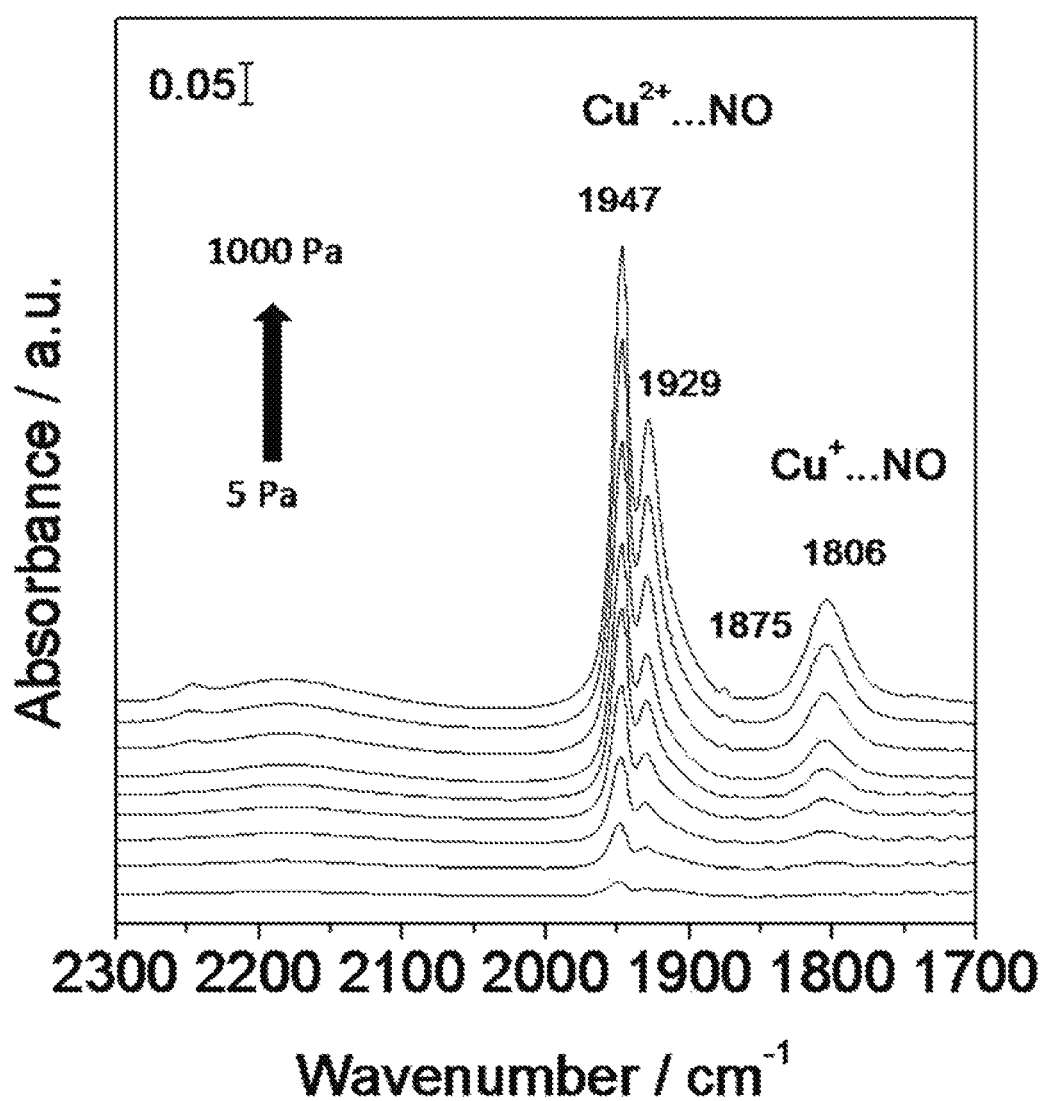
FIG. 5 shows the shows the UV-Vis spectra of a zeolitic materials prepared according to Example 1.2 (Cu(4.8)-TF-SSZ13(K)-3.7).
Figure 6:
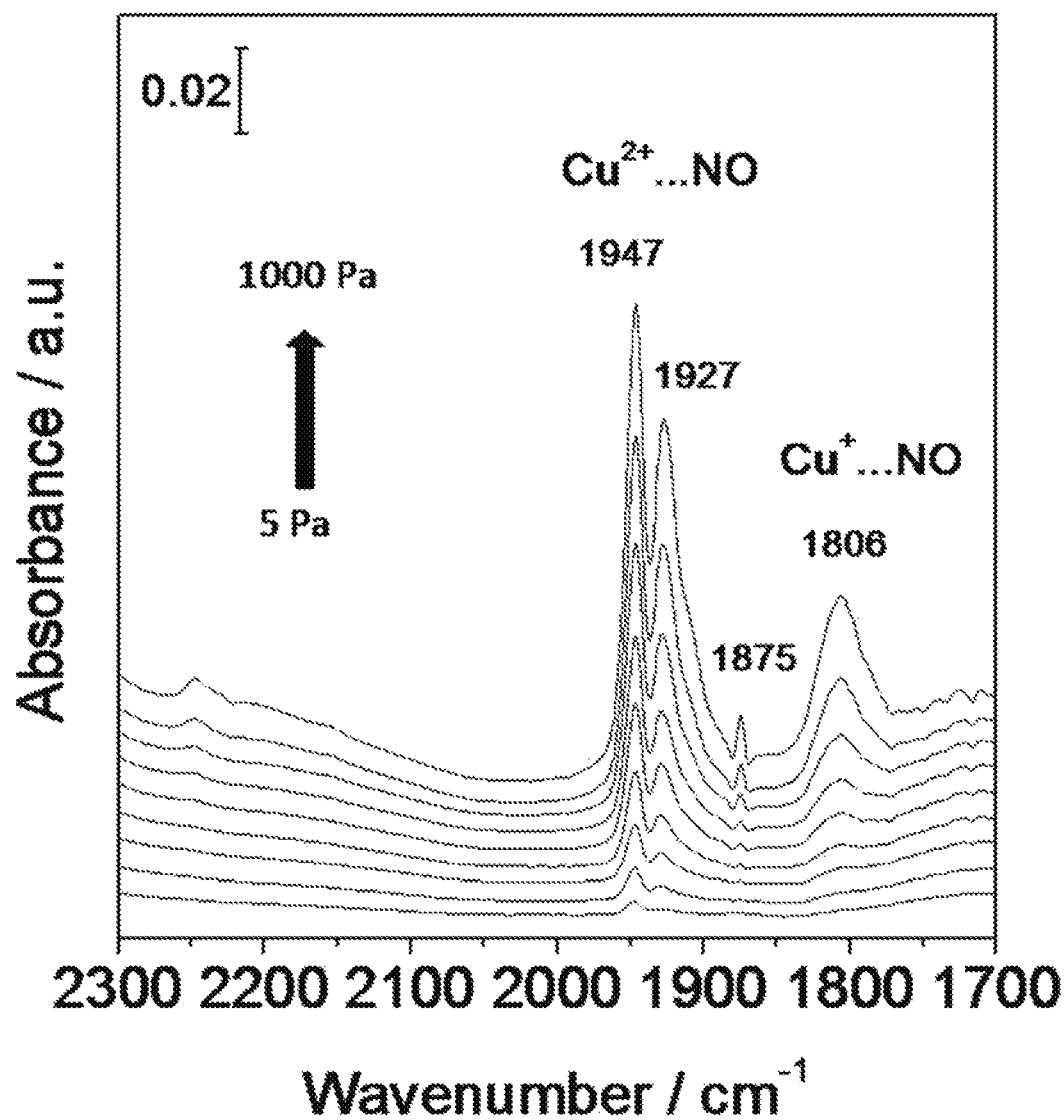
FIG. 6 shows the shows the UV-Vis spectra of a zeolitic materials prepared according to Example 2.2 (Cu(2.6)-TF-SSZ13(Cs)-4.2).
Figure 7:
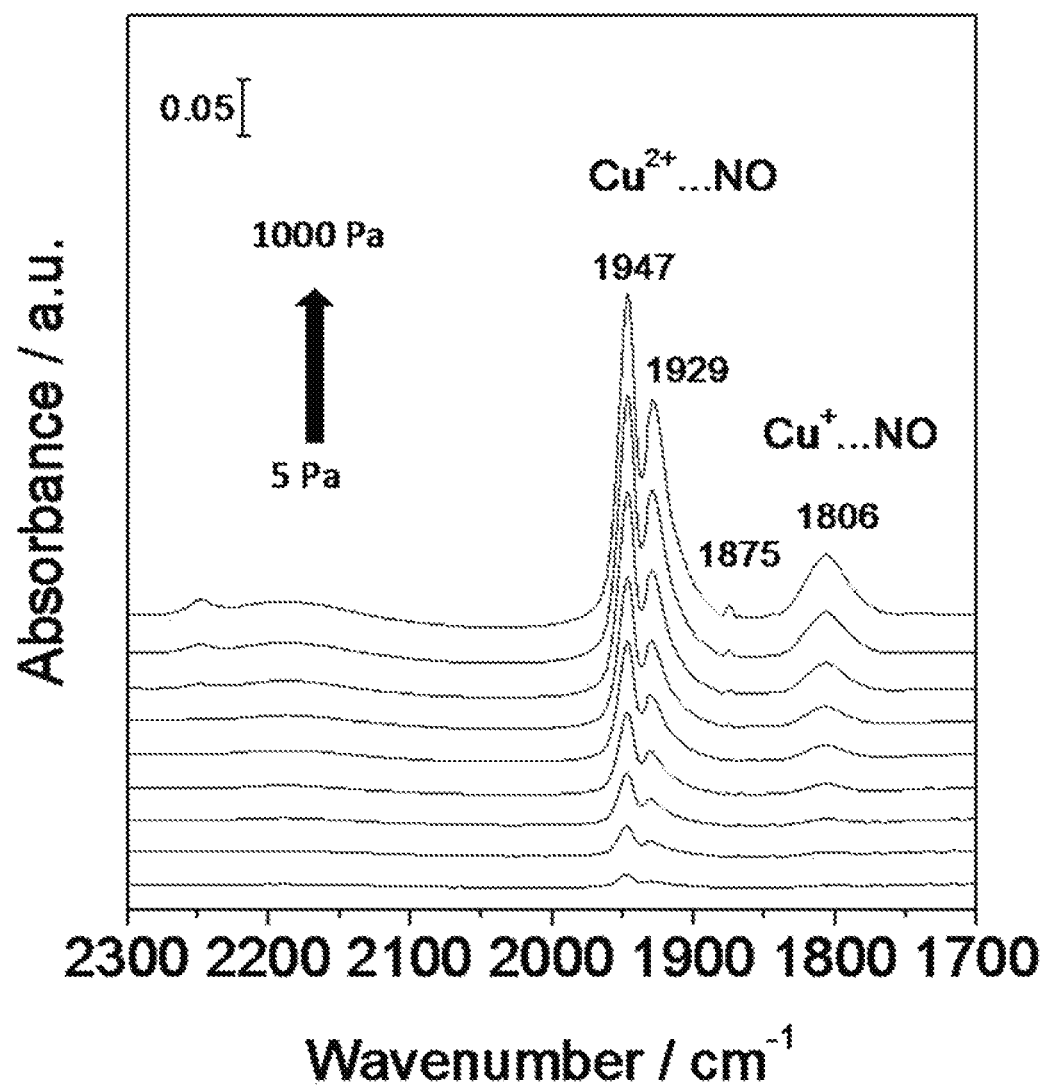
FIG. 7 shows the shows the UV-Vis spectra of a zeolitic materials prepared according to Example 2.2 (Cu(3.8)-TF-SSZ13(Cs)-4.2).
Figure 8:
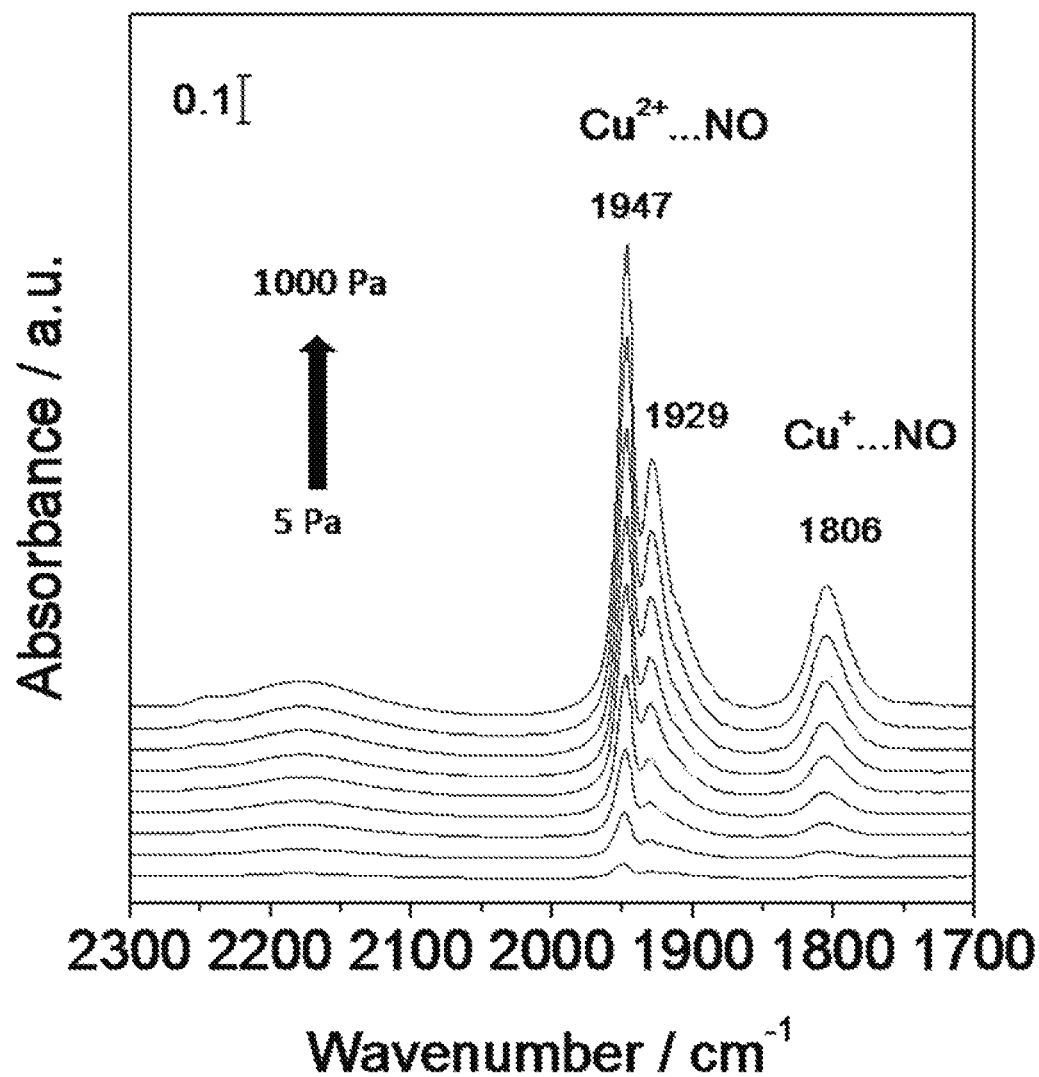
FIG. 8 shows the shows the UV-Vis spectra of a zeolitic materials prepared according to Example 2.2 (Cu(4.2)-TF-SSZ13(K)-4.2).
Figure 9:
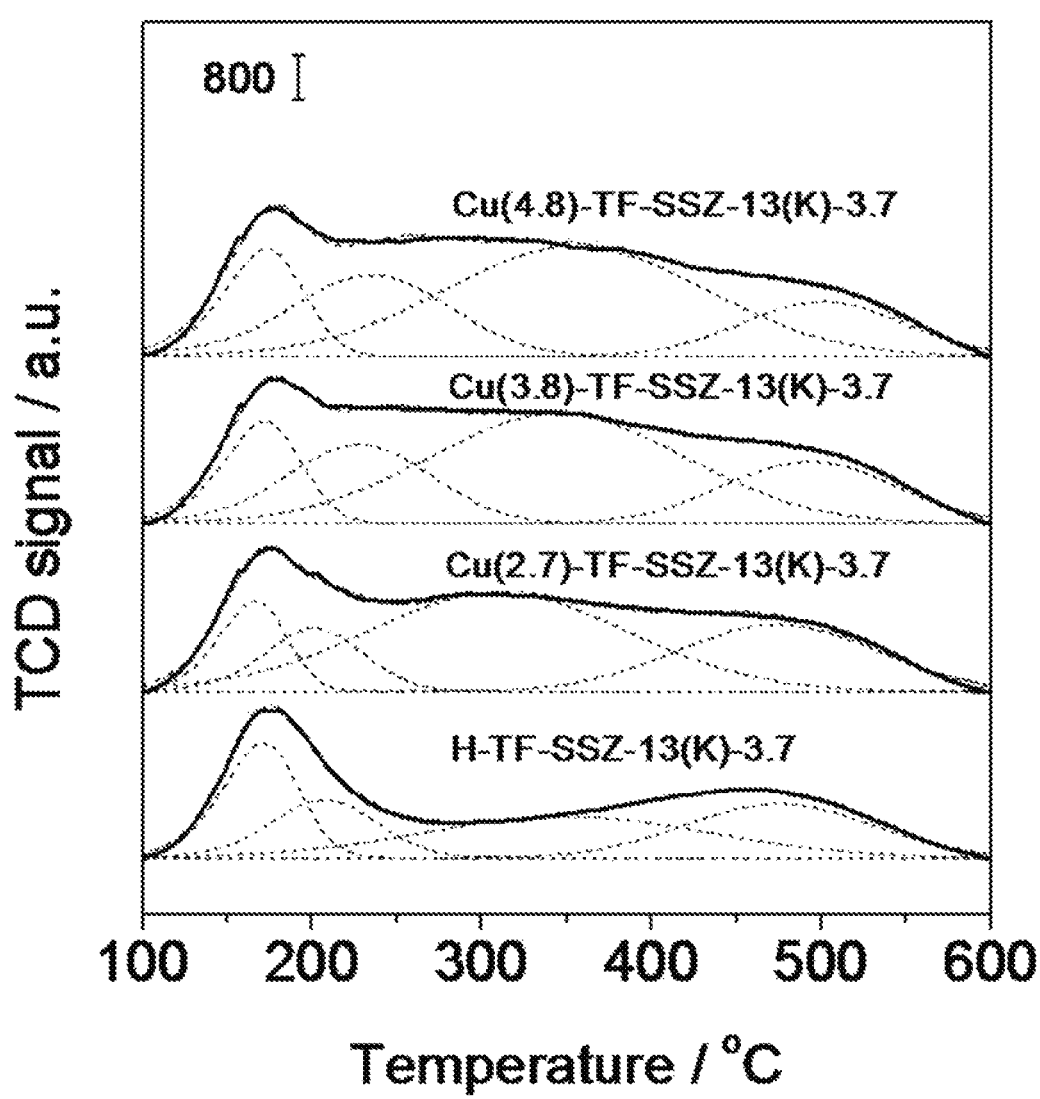
FIG. 9 shows the NH3-TPD profiles of the three materials prepared according to Example 1.2 and the material prepared according to Example 1.1 c).
Figure 10:
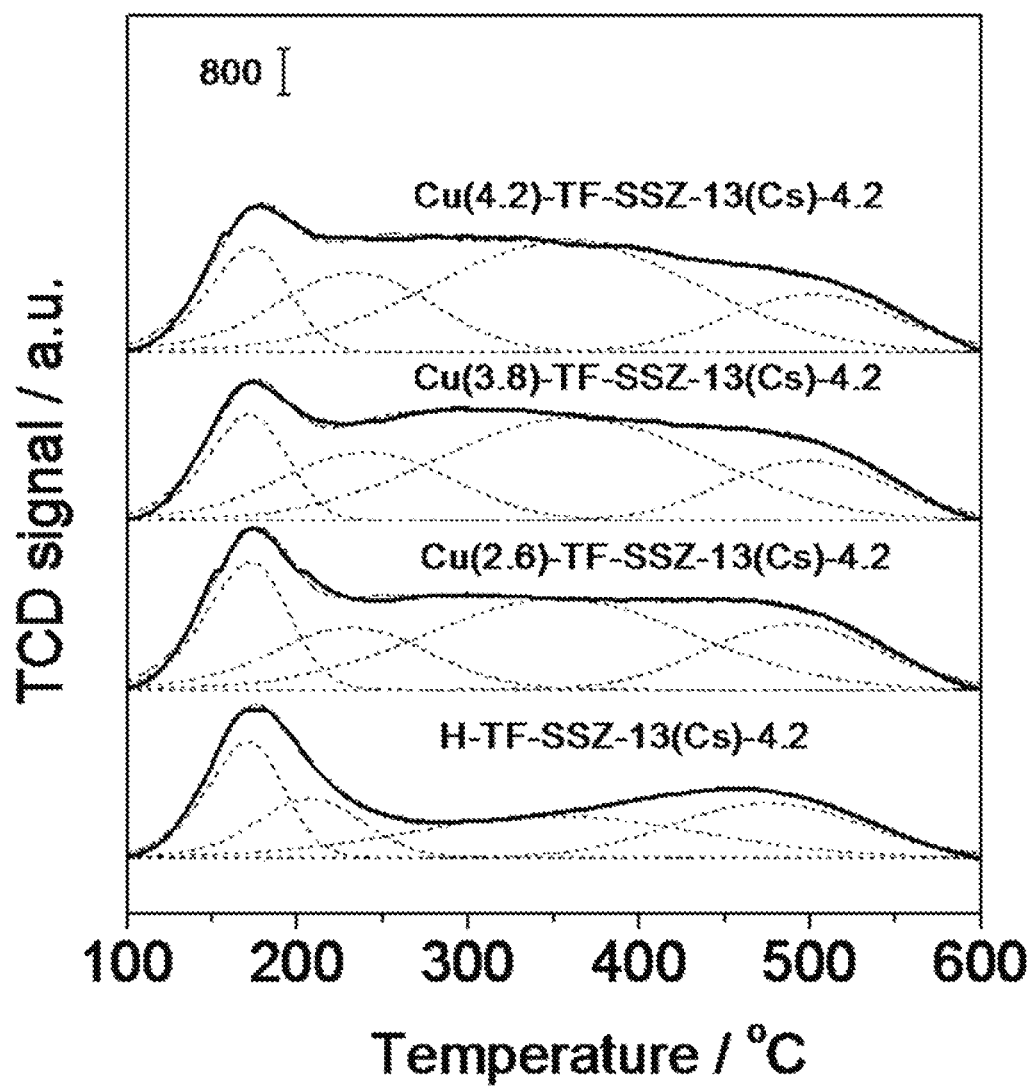
FIG. 10 shows the NH3-TPD profiles of the three materials prepared according to Example 2.2 and the material prepared according to Example 2.1 c).
Figure 11:
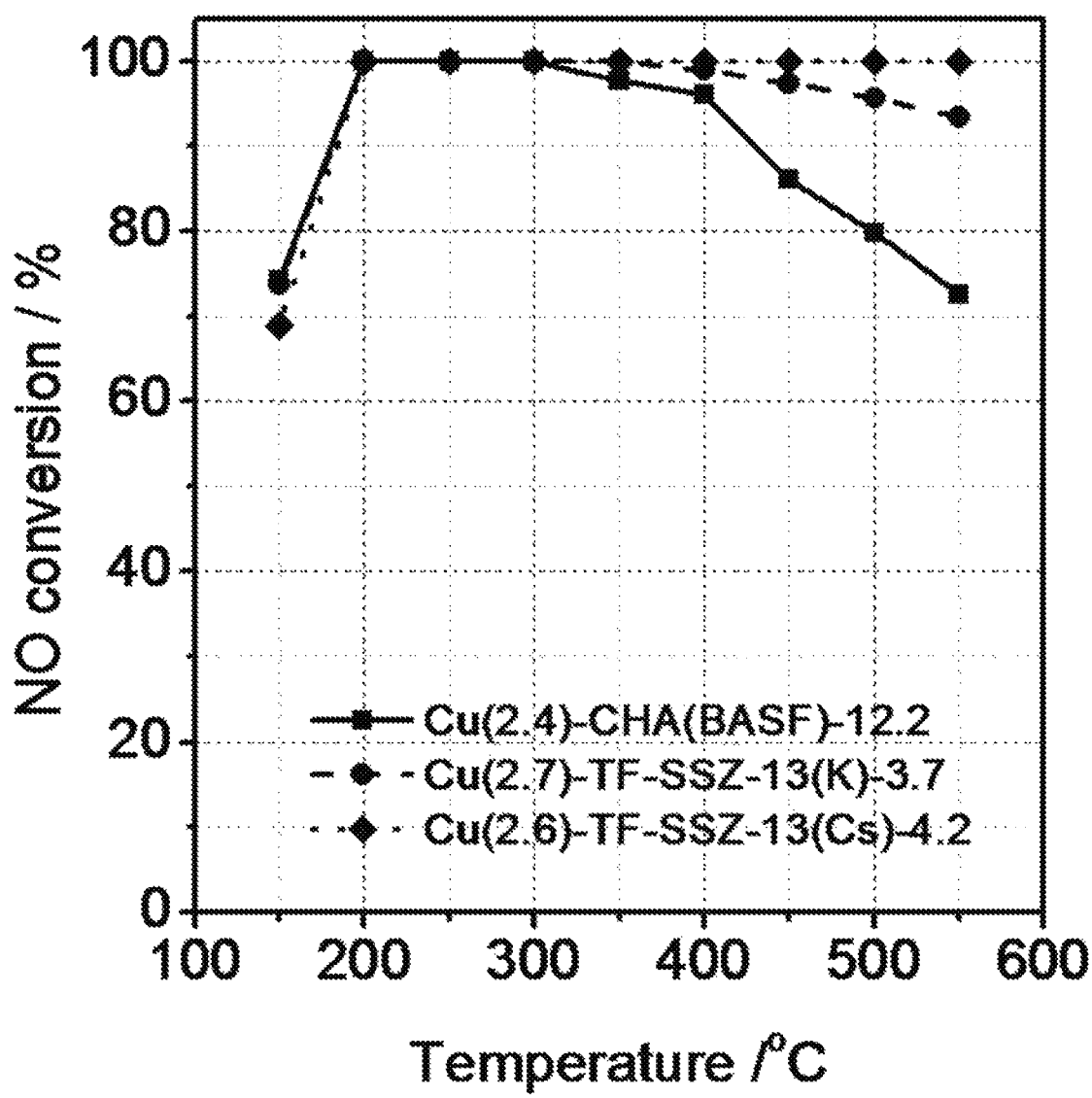
FIG. 11 shows the NO conversion as a function of the applied temperature for the $NH_3$-SCR testing according to Example 3 of two fresh catalysts comprising a zeolitic material according to the present invention and one catalyst comprising a fresh comparative zeolitic material.
Figure 12:
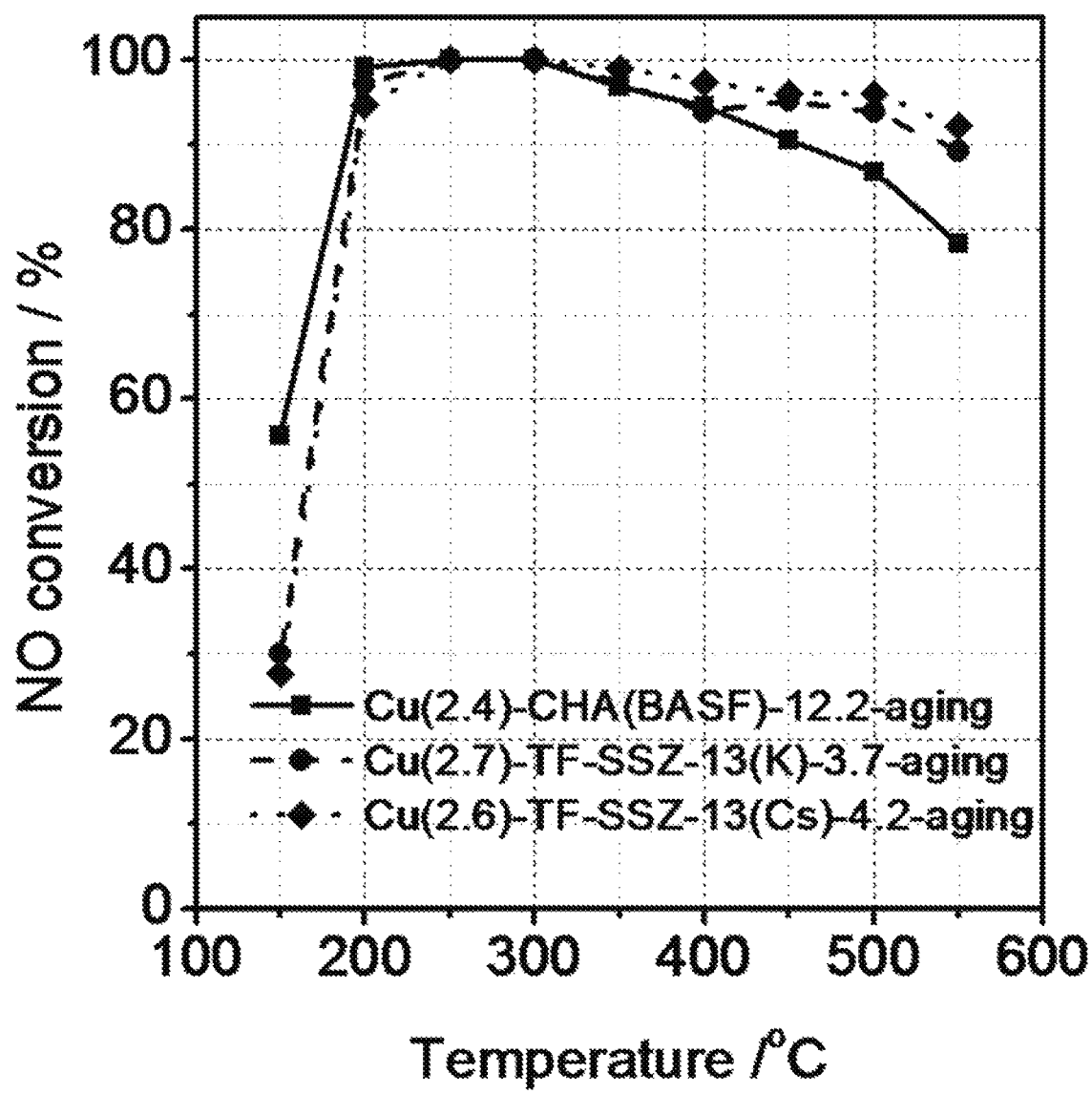
FIG. 12 shows the NO conversion as a function of the applied temperature for the $NH_3$-SCR testing according to Example 3 of two aged catalysts comprising a zeolitic material according to the present invention and one catalyst comprising an aged comparative zeolitic material.

The invention claimed is:

1. A zeolitic material having framework type CHA, comprising a transition metal M and an alkali metal A, and having a framework structure comprising a tetravalent element Y, and a trivalent element X and O,
   wherein the transition metal M is a transition metal of groups 7 to 12 of a periodic table, A is one or more of K and Cs, Y is Si, and X is Al;
   wherein M comprises Cu;
   wherein the zeolitic material having framework type CHA further comprises Na.

2. The zeolitic material of claim 1, comprising M in an amount in a range of from 0.5 to 7.5 weight-%, calculated as elemental M and based on a total weight of the zeolitic material, and wherein M further comprises Fe.

3. The zeolitic material of claim 1, comprising A in an amount in a range of from 0.05 to 5 weight-%, calculated as elemental A and based on a total weight of the zeolitic material.

4. The zeolitic material of claim 1, wherein in the framework structure, a molar ratio of Y relative to X, calculated as $YO_2:X_2O_3$, is in a range of from 3:1 to 20:1.

5. The zeolitic material of claim 1, wherein at least 98 weight-% of the zeolitic material consist of M, A, Y, X, O, H, and Na, and wherein at least 98 weight-% of the framework structure consist of Y, X, O, and H.

6. The zeolitic material of claim 1, having one or more of the following characteristics:
   a total amount of acid sites in a range of from 2.0 to 3.2 mmol/g, wherein the total amount of acid sites is defined as a total molar amount of desorbed ammonia per mass of the zeolitic material determined according to a temperature programmed desorption of ammonia; wherein the zeolitic material has an amount of medium acid sites in a range of from 1.0 to 1.7 mmol/g, wherein the amount of medium acid sites is defined as an amount of desorbed ammonia per mass of the zeolitic material determined according to the temperature programmed desorption of ammonia in a temperature range of from 250 to 450° C.;
   a peak having a maximum in a range of from 210 to 205 nm, determined according to UV-Vis spectroscopy; and
   a peak having a maximum in a range of from 1,945 to 1,950 $cm^{-1}$, a peak having a maximum in a range of from 2,245 to 2,250 $cm^{-1}$, a peak having a maximum in a range of from 1,925 to 1,930 $cm^{-1}$, a peak having a maximum in a range of from 1,870 to 1,880 $cm^{-1}$, and a peak having a maximum in a range of from 1,805 to 1,810 $cm^{-1}$, determined according to NO adsorption via FT-IR at a pressure of 1,000 Pa.

7. A process for preparing the zeolitic material according to claim 1, the process comprising
   (i) providing a zeolitic material having framework type CHA in its ammonium form, the zeolitic material comprising an alkali metal A, and having a framework structure comprising a tetravalent element Y, and a trivalent element X and O, wherein A is one or more of K and Cs, Y is one or more of Si, and X is Al;
   wherein M comprises Cu;
   wherein the zeolitic material provided having framework type CHA further comprises Na;
   (ii) subjecting the zeolitic material having framework type CHA in its ammonium form to ion exchange conditions, comprising bringing the zeolitic material having framework type CHA in its ammonium form in contact with a solution comprising ions of a transition metal M of groups 7 to 12 of the periodic table, obtaining a mixture comprising a zeolitic material having framework type CHA, comprising a transition metal M and an alkali metal A, and having a framework structure comprising a tetravalent element Y, and a trivalent element X and O; and
   (iii) separating the zeolitic material having framework type CHA from the mixture.

8. The process of claim 7, wherein the providing a zeolitic material having framework type CHA in its ammonium form comprises:
   (i.1) preparing a synthesis mixture comprising water, a source of Y, a source of X, and a source of A;
   (i.2) subjecting the synthesis mixture to hydrothermal crystallization conditions comprising heating the synthesis mixture to a temperature in a range of from 150 to 200° C. and keeping the synthesis mixture at a temperature in the range of from 150 to 200° C. under autogenous pressure, obtaining a mother liquor comprising a zeolitic material having framework type CHA which comprises A;

(i.3) separating the zeolitic material obtained from (i.2) from the mother liquor;

(i.4) subjecting the zeolitic material obtained from (i.3) to ion exchange conditions, comprising bringing a solution comprising ammonium ions in contact with the zeolitic material obtained from (i.3), obtaining a zeolitic material having framework type CHA in its ammonium form.

9. The process of claim 8, wherein Y is Si and the source of Y comprises one or more of silica and a silicate, wherein X is Al and the source of X comprises one or more of alumina and an aluminum salt, and wherein the source of A comprises one or more of a halide of A, a nitrate of A, and a hydroxide of A.

10. The process of claim 8, wherein the synthesis mixture prepared further comprises a seed crystal material comprising a zeolitic material having framework type CHA.

11. The process of claim 8, wherein the solution comprising ammonium ions according to (i.4) has an ammonium concentration in the range of from 1 to 5 mol/l.

12. The process of claim 7, wherein the solution comprising ions of a transition metal M is an aqueous solution comprising a dissolved salt of the transition metal M.

13. The process of claim 7, further comprising (iv) calcining the zeolitic material obtained from (iii), obtaining the zeolitic material having framework type CHA, comprising a transition metal M and an alkali metal A, and having a framework structure comprising a tetravalent element Y, and a trivalent element X and O.

14. A zeolitic material obtained by the process according to claim 7.

15. A catalyst, comprising the zeolitic material according to claim 1.

* * * * *